(12) United States Patent
Schrank

(10) Patent No.: US 11,779,783 B2
(45) Date of Patent: Oct. 10, 2023

(54) FALL-PROTECTION APPARATUS COMPRISING BRAKING DEVICE WITH VELOCITY-ACTUATED, ACCELERATION-MODULATED PAWL(S)

(71) Applicant: 3M INNOVATIVE PROPERTIES COMPANY, St. Paul, MN (US)

(72) Inventor: Greg E. Schrank, Bloomington, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 18/013,143

(22) PCT Filed: Jun. 23, 2021

(86) PCT No.: PCT/IB2021/055570
§ 371 (c)(1),
(2) Date: Dec. 27, 2022

(87) PCT Pub. No.: WO2022/003501
PCT Pub. Date: Jan. 6, 2022

(65) Prior Publication Data
US 2023/0271038 A1      Aug. 31, 2023

Related U.S. Application Data

(60) Provisional application No. 62/705,535, filed on Jul. 2, 2020.

(51) Int. Cl.
*A62B 35/00* (2006.01)
*A62B 35/04* (2006.01)

(52) U.S. Cl.
CPC .......... *A62B 35/0093* (2013.01); *A62B 35/04* (2013.01)

(58) Field of Classification Search
CPC ..... A62B 35/0093; A62B 35/04; F16D 59/02; F16D 59/00
(Continued)

(56) References Cited

U.S. PATENT DOCUMENTS 5,447,280 A   9/1995 Feathers
5,722,612 A   3/1998 Feathers
(Continued)

FOREIGN PATENT DOCUMENTS

JP   2001149490 A   6/2001
NZ   715391   12/2015
(Continued)

OTHER PUBLICATIONS

International Search Report for PCT International Application No. PCT/IB2021/055570, dated Oct. 10, 2021, 3 pages.

*Primary Examiner* — Anita M King
(74) *Attorney, Agent, or Firm* — Kenneth B Wood

(57) ABSTRACT

A fall-protection apparatus with a drum and a rotationally-activated braking device including at least one velocity-actuated pawl that is mounted on a pawl-support plate that is rotatable relative to the drum through a predetermined range between a first position and a second position. The pawl-support plate is rotatable relative to the drum from the first position to the second position upon the pawl-support plate experiencing a rotational acceleration that is above a predetermined threshold value of rotational acceleration. When the pawl-support plate is in the second position, the velocity-actuated pawl can be actuated by a rotational velocity that is lower than a rotational velocity required to actuate the pawl when the pawl-support plate is in the first position.

21 Claims, 11 Drawing Sheets

(58) Field of Classification Search
USPC .......................................................... 182/232
See application file for complete search history.

(56) References Cited

U.S. PATENT DOCUMENTS

| | | | |
|---|---|---|---|
| 5,835,007 A | 11/1998 | Kosiak | |
| 5,928,300 A | 7/1999 | Rogers et al. | |
| 7,206,680 B2 | 4/2007 | Roelleke | |
| 7,460,937 B2 | 12/2008 | Lahmann et al. | |
| 7,484,585 B2 | 2/2009 | Takemura | |
| 7,912,608 B2 | 3/2011 | Willerton | |
| 8,181,744 B2 | 5/2012 | Parker et al. | |
| 8,256,574 B2 | 9/2012 | Griffiths et al. | |
| 8,430,206 B2 | 4/2013 | Griffiths et al. | |
| 8,430,207 B2 | 4/2013 | Griffiths et al. | |
| 8,430,208 B2 * | 4/2013 | Griffiths .................. | A62B 1/08 242/383.3 |
| 8,511,434 B2 | 8/2013 | Blomberg | |
| 9,488,235 B2 | 11/2016 | Casebolt | |
| 9,764,172 B2 * | 9/2017 | Wolner ............. | A62B 35/0093 |
| 2004/0073346 A1 | 4/2004 | Roelleke | |
| 2007/0228713 A1 | 10/2007 | Takemura | |
| 2008/0059028 A1 | 3/2008 | Willerton | |
| 2010/0224448 A1 * | 9/2010 | Wolner .................... | A62B 1/10 182/234 |
| 2011/0209948 A1 * | 9/2011 | Auston ................... | B65H 75/28 188/68 |
| 2013/0277631 A1 | 10/2013 | Luntz et al. | |
| 2016/0096048 A1 | 4/2016 | Fegley et al. | |
| 2018/0370484 A1 | 12/2018 | Diehl et al. | |
| 2021/0077840 A1 * | 3/2021 | Boraas ............... | A62B 35/0093 |
| 2022/0161071 A1 * | 5/2022 | Hung ...................... | A62B 1/10 |

FOREIGN PATENT DOCUMENTS

| | | |
|---|---|---|
| WO | 2017072436 A1 | 5/2017 |
| WO | 2017105255 A1 | 6/2017 |
| WO | 2019012454 A1 | 1/2019 |
| WO | 2022003500 A1 | 1/2022 |
| WO | 2022009174 A1 | 1/2022 |
| WO | WO-2022009174 A1 * | 1/2022 |

* cited by examiner

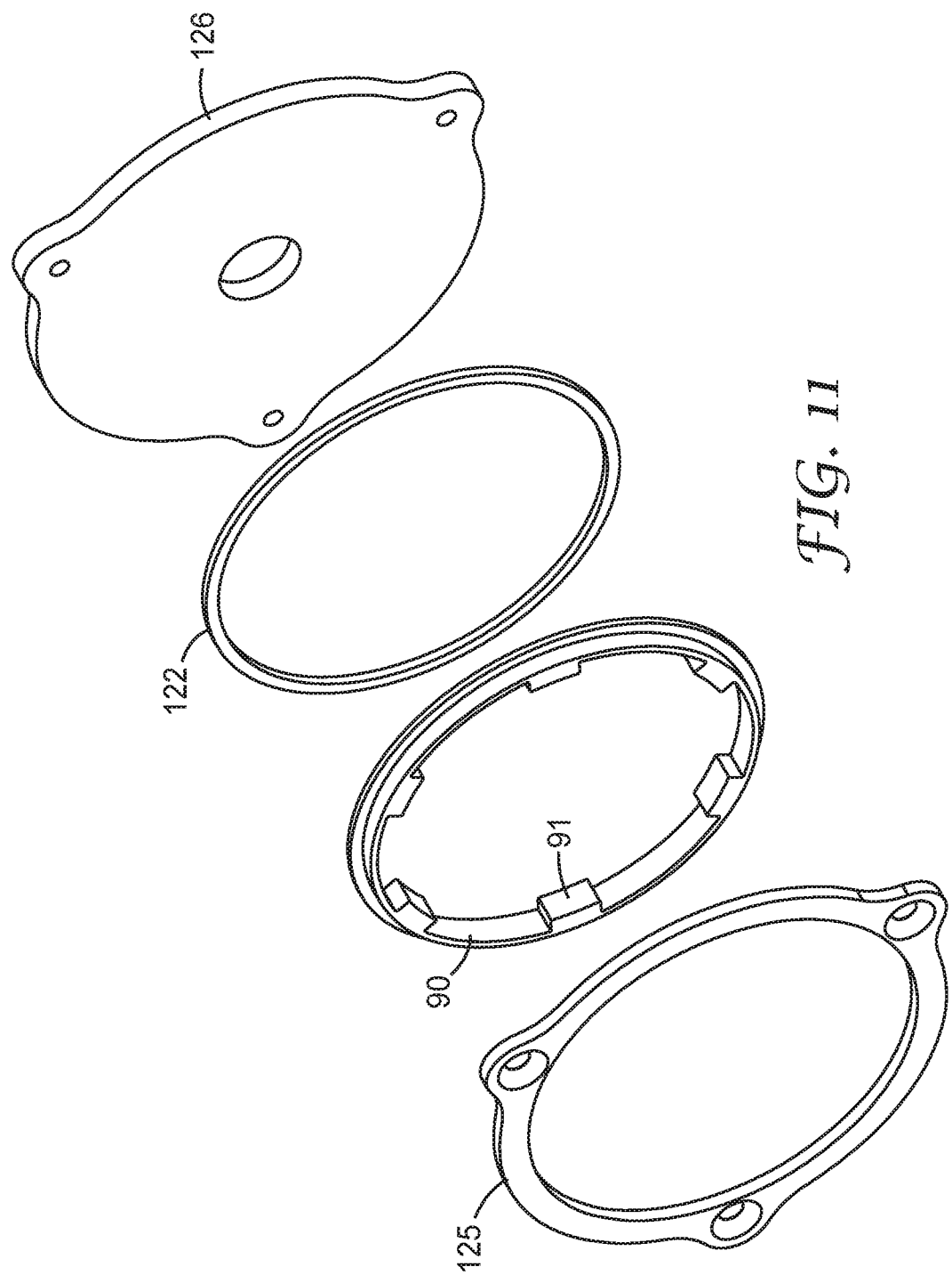

FALL-PROTECTION APPARATUS COMPRISING BRAKING DEVICE WITH VELOCITY-ACTUATED, ACCELERATION-MODULATED PAWL(S)

CROSS REFERENCE TO RELATED APPLICATIONS

This application is a national stage filing under 35 U.S.C. 371 of PCT/IB2021/055570, filed 23 Jun. 2021, which claims the benefit of U.S. Provisional Patent Application No. 62/705,535, filed 2 Jul. 2020, the disclosure of which is incorporated by reference in its/their entirety herein.

BACKGROUND

Fall-protection apparatus such as self-retracting lifelines have often found use in applications such as building construction and the like.

SUMMARY

In broad summary, herein is disclosed a fall-protection apparatus comprising a drum and a rotationally-activated braking device including at least one velocity-actuated pawl that is mounted on a pawl-support plate that is rotatable relative to the drum through a predetermined range between a first position and a second position. The pawl-support plate is rotatable relative to the drum from the first position to the second position upon the pawl-support plate experiencing a rotational acceleration that is above a predetermined threshold value of rotational acceleration. When the pawl-support plate is in the second position, the velocity-actuated pawl can be actuated by a rotational velocity that is lower than a rotational velocity required to actuate the pawl when the pawl-support plate is in the first position. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

BRIEF DESCRIPTION OF THE DRAWINGS

FIG. 11 is an isolated exploded perspective view of an exemplary friction brake.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "front", "back", "outward", "inward", and "first" and "second" may be used in this disclosure, it should be understood that those terms are used in their relative sense only unless otherwise noted. Terms such as "top", "bottom", "upper", "lower", "under", "over", "horizontal", "vertical", and "up" and "down" will be understood to have their usual meaning with respect to the Earth.

Figure 2:
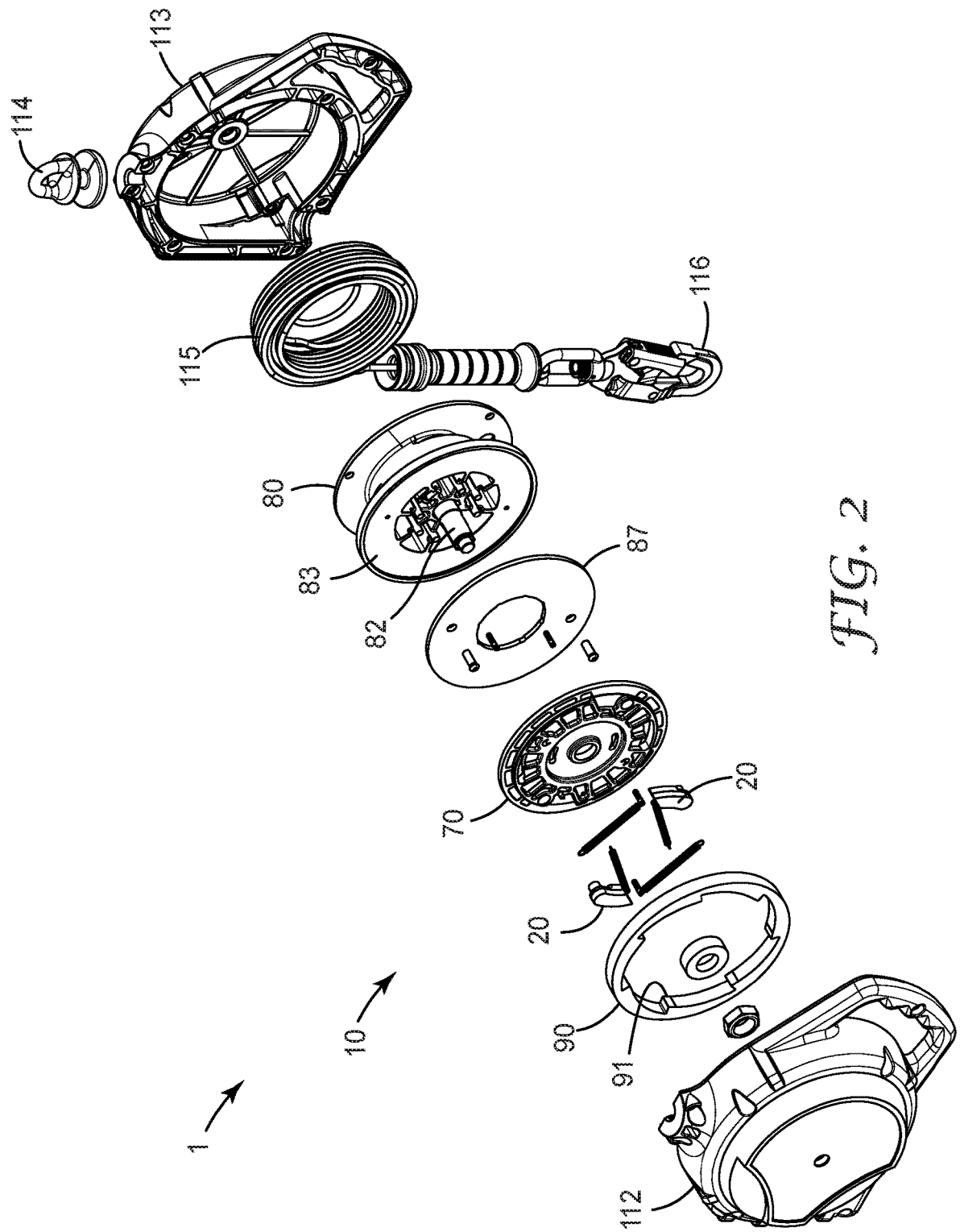
FIG. 2 is a perspective partially-exploded view of various components of an exemplary fall-protection apparatus.
Figure 3:
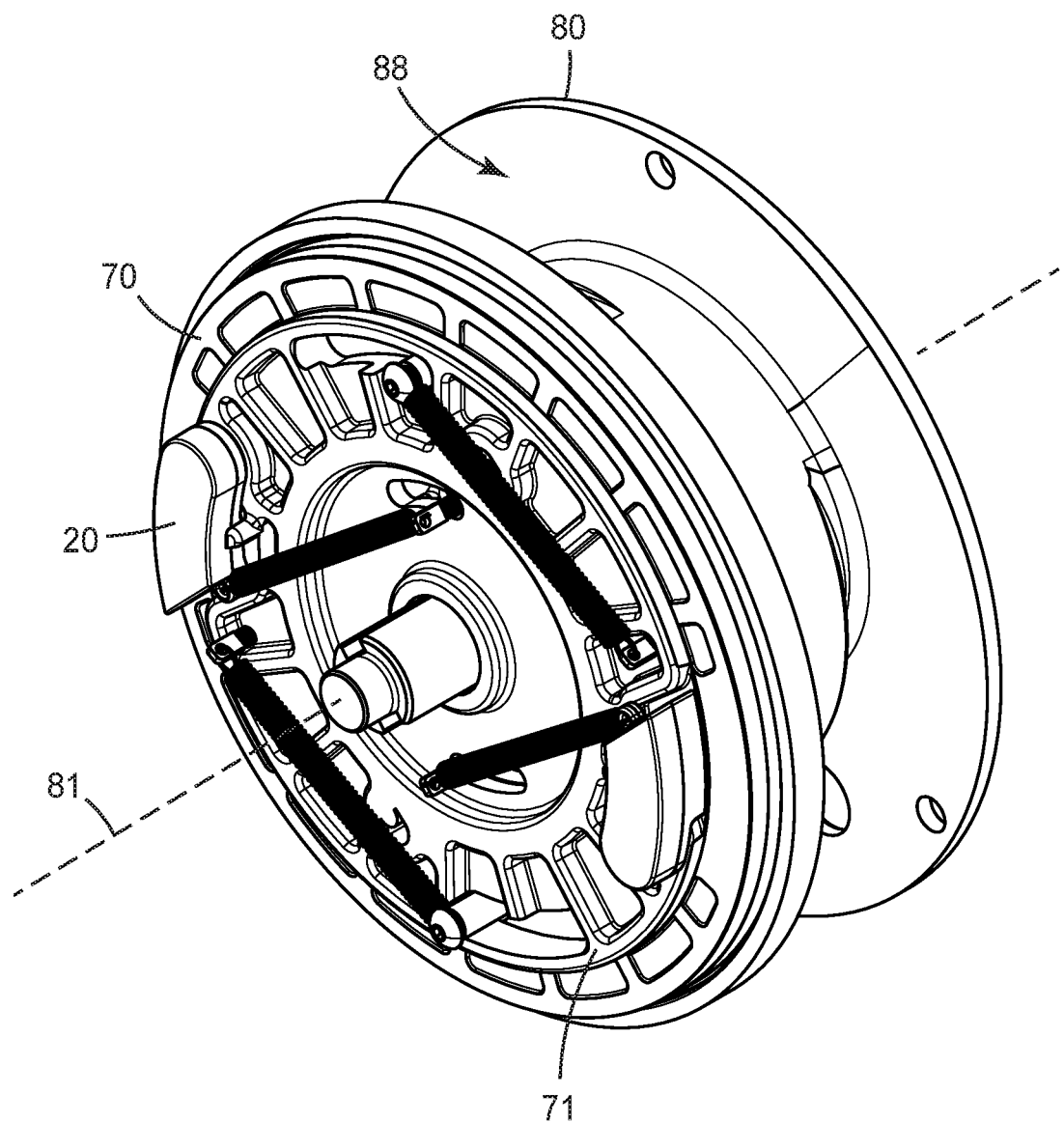
FIG. 3 is an isolated perspective view of particular components of an exemplary fall-protection apparatus, including a drum and a pawl-support plate with a pair of velocity-actuated pawls pivotally mounted thereon.

Geometric descriptors are used herein, unless otherwise specified, with reference to a drum 80 and an associated pawl-support plate 70 of a fall-protection apparatus as described in detail herein and as shown in FIG. 2. The term "axially" refers to a direction at least generally parallel to the axis of rotation of the drum, plate, and associated components (e.g. axis of rotation 81 as shown in FIG. 3). The term "radial" and like terms refers to a direction generally parallel to the radius and diameter of the drum and plate and generally perpendicular to the axial direction. (For examples, lines 31 and 32 of FIG. 10 each extend in a radial direction.) The terms circumferential, circumferentially, and like terms, refer to an arcuate direction that exhibits a generally constant radius relative to the axis of rotation of the drum and associated components (for example, orbital pathway 25 as indicated on FIG. 10, follows a circumferential path).

Figure 10:
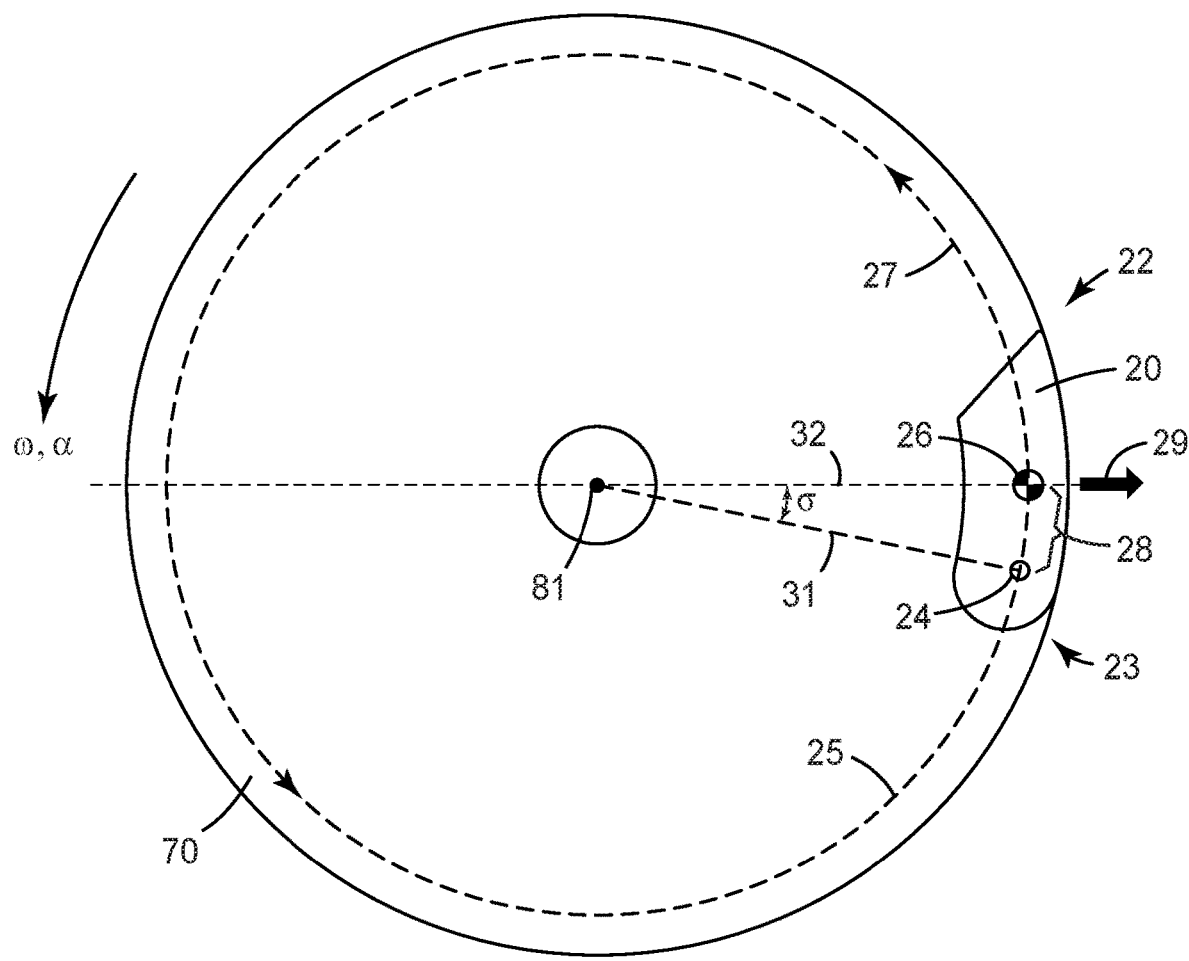
FIG. 10 is a simplified plan view of a pawl-support plate with a velocity-actuated pawl pivotally mounted thereon.

The direction of rotation of various components (e.g. drum 80, pawl-support plate 70, and other items) in the instance that drum 80 turns rapidly in the event of a user fall, is denoted in various Figures herein by an arcuate arrow labeled ω. (Discussions herein will make it clear that these items can sometimes rotate in the opposite direction; however, the particular direction of fall-induced rotation will be used in order to standardize terms used herein.) Terms such as "leading" and "trailing" are used to characterize the relative position of various items that travel along a generally circumferential pathway in the event of the above-described rotation. "Leading" refers to a component that, upon such rotation, passes a fixed point before a "trailing" component passes the fixed point. In other words, end 22 of pawl 20 as shown in FIG. 10, is a leading end; end 23 is a trailing end of pawl 20. In some instances, a "leading" direction and a "trailing" direction will be respectively referred to herein as a circumferentially-forward direction and a circumferentially-rearward direction. The meanings of all of these terms, and related terms and phrases, will be readily apparent based on the descriptions and Figures presented herein.

As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). The term "substantially", unless otherwise specifically defined, means to a high degree of approximation (e.g., within +/−10% for quantifiable properties). The term "essentially" means to a very high degree of approximation (e.g., within plus or minus 2% for quantifiable properties; it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. The term "configured to" and like terms is at least as restrictive as the term "adapted to", and requires actual design intention to perform the specified function rather than mere physical capability of performing such a function. All references herein to numerical parameters (dimensions, ratios, and so on) are understood to be calculable (unless otherwise noted) by the use of average values derived from a number of measurements of the parameter.

DETAILED DESCRIPTION

Disclosed herein is a fall-protection apparatus, by which is meant an apparatus that acts to controllably decelerate a human user of the apparatus in the event of a user fall. By definition, such a fall-protection apparatus is a non-motorized apparatus. By this is meant that a safety line of the apparatus is not moved (i.e., extended or retracted from a housing of the apparatus) by way of an electrically powered motor; in other words, the apparatus is not used as part of a system (e.g., an elevator, a hoist, etc.) that uses one or more motors to raise or lower a load.

In many embodiments, such a fall-protection apparatus may be a self-retracting lifeline (SRL); i.e., a deceleration apparatus comprising a housing at least partially contains a drum-wound safety line that can be extended from the housing and retracted into the housing under slight tension during normal movement of a human user of the apparatus, and which, upon the onset of a user fall, automatically arrests (i.e., slows to a controlled rate, or completely stops) the fall of the user. Such an apparatus may comprise a safety line that can be extended out of a lower end of the apparatus with the apparatus having an upper, anchorage end which may be connected e.g. to a secure anchorage of a workplace. Often, such an apparatus may comprise a drum that is rotatably mounted within a housing therein such that such that the safety line can be wound about the drum when the line is retracted into the housing. Such an apparatus will further comprise a rotationally-activated braking device. By this is meant a device that is configured to slow (e.g. stop) the rotation of the drum upon rotation of the drum with a velocity above a predetermined threshold value of velocity.

Figure 1:
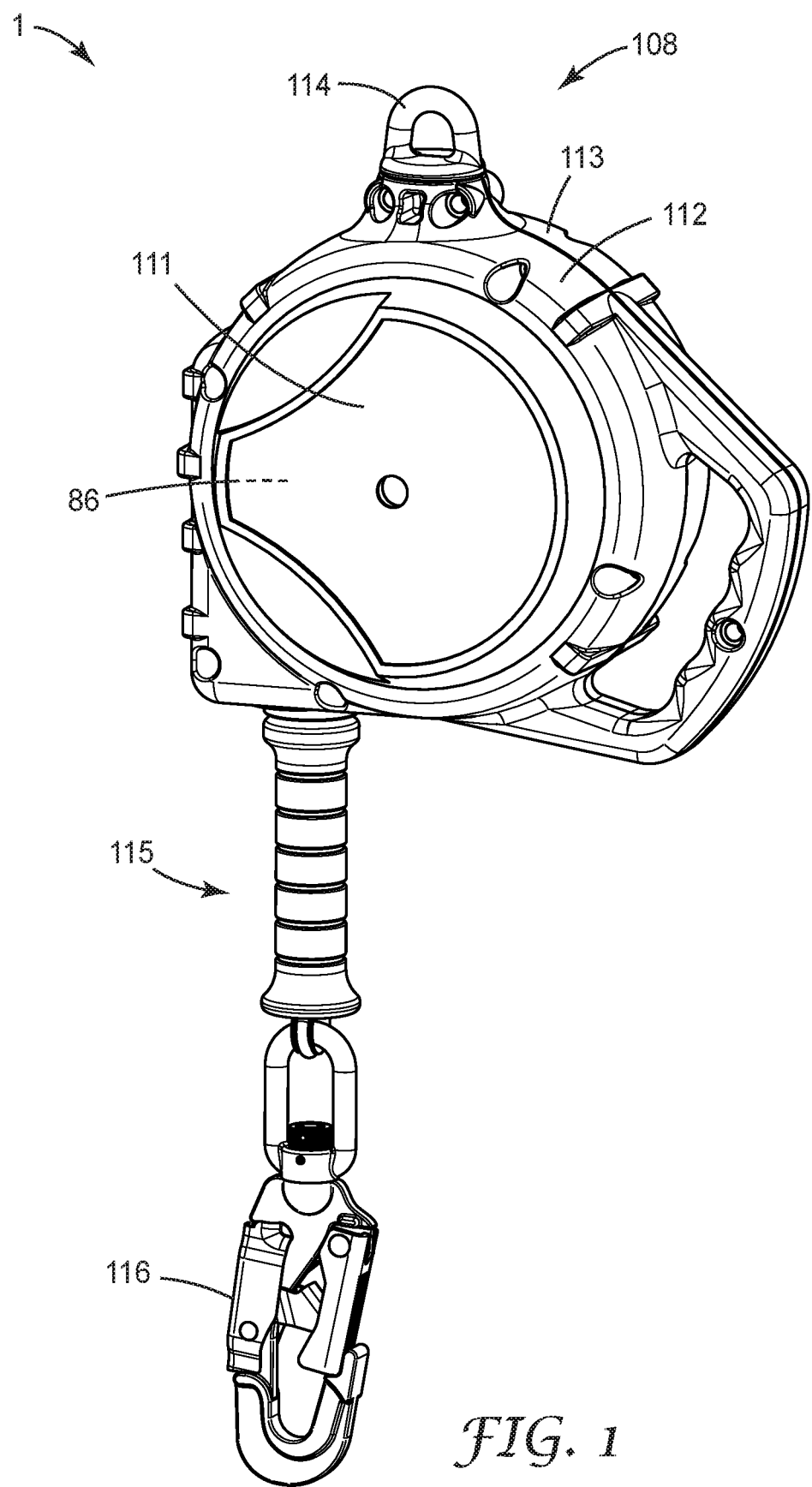
FIG. 1 is a perspective view of an exemplary fall-protection apparatus.

An exemplary fall-protection apparatus (a self-retracting lifeline) 1 is depicted in FIG. 1. Such an apparatus may comprise a housing 111 that is provided e.g. from a first housing piece 112 and second housing piece 113 that are assembled and fastened together to form the housing. Housing pieces 112 and 113 may be fastened together e.g. by bolts or by any other suitable fasteners. Various ancillary components such as e.g. one or more nuts, bolts, screws, shafts, washers, bushings, gaskets, bearings, labels, auxiliary housing pieces or shields, and the like, are omitted from the Figures herein for ease of presentation of components of primary interest; ordinary artisans will readily appreciate that any such items may be present as needed for the functioning of apparatus 1. In some embodiments, housing 111 may be load-bearing; in some embodiments, a load bracket or similar component may be present and may provide at least a portion of the load-bearing path of the apparatus.

Further details of exemplary apparatus 1 are depicted in FIG. 2, which is a partially exploded view with the second housing piece 113 omitted. Within an interior space at least partially defined by housing 111 is a drum 80, which defines a receiving space 88 into which is wound (e.g., spiral-wound) a length of safety line 115 (with the term line broadly encompassing any elongate, windable load-bearing member, including e.g. webbing, cable, rope, etc., made of any suitable synthetic or natural polymeric material, metal, etc., or any combination thereof). A proximal end of line 115 is connected, directly or indirectly, to drum 80 (such a connection encompasses configurations in which the proximal end of line 115 is connected to a shaft 82 on which drum 80 is mounted). Drum 80 is rotatably mounted within housing 111, e.g. by being rotatably mounted on a shaft 82 and/or by being mounted on a shaft 82 that is rotatable relative to the housing. A biasing member 86 (not visible in FIG. 2 but indicated in generic representation in FIG. 1, and which may be e.g. a suitable spring such as a spiral-coiled torsion spring) may be provided, which serves to bias the drum toward rotating in a direction that will retract safety line 115 onto the drum unless the biasing force is overcome e.g. by movement of a human user.

Apparatus 1 comprises a rotationally-activated braking device 10, as shown in exemplary embodiment in FIG. 2. Such a rotationally-activated braking device relies on one or more velocity-actuated pawls 20. Typically, the at least one pawl 20 is co-rotatable with drum 80. By this is meant that such a pawl is able to rotate along with drum 80, with the pawl(s) moving in an orbital path about a center of orbital motion that coincides with the axis of rotation of the drum. In the illustrated embodiment of FIG. 2, such an arrangement is achieved by mounting pawls 20 on a pawl-support plate 70 which is mounted on the same shaft 82 on which drum 80 is mounted. In other words, in at least some embodiments pawl-support plate 70 is axially co-mounted with drum 80 and is co-rotatable with drum 80. By co-rotatable is meant that plate 70 will rotate in unison with drum 80 the vast majority of the time during ordinary use of apparatus 1; it is only in certain instances (e.g. in the event of a user fall) that plate 70 may rotate relative to drum 80, through a predetermined range as described in detail later herein.

Figure 4:
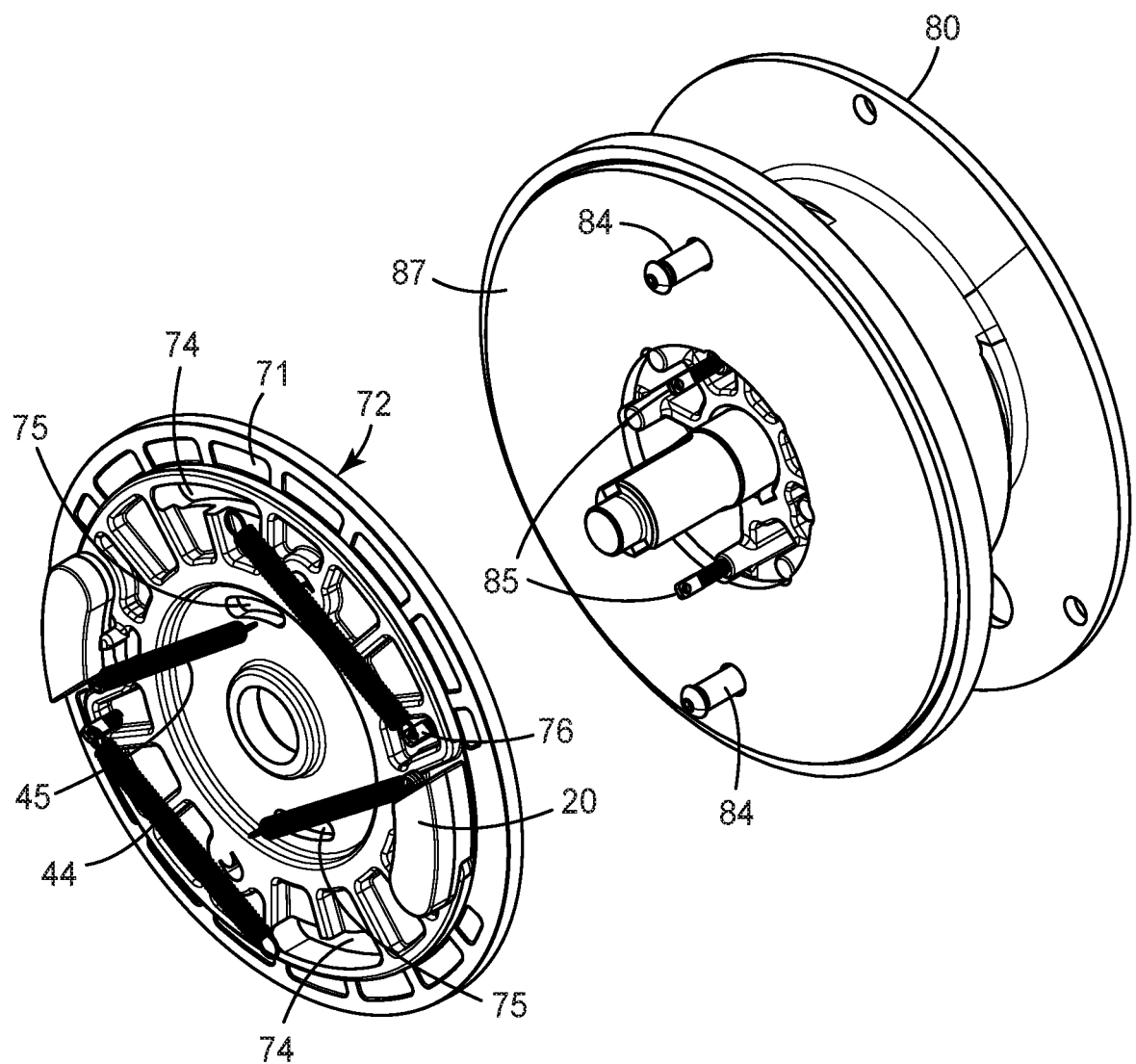
FIG. 4 is a partially exploded perspective view of the items of FIG. 3.
Figure 5:
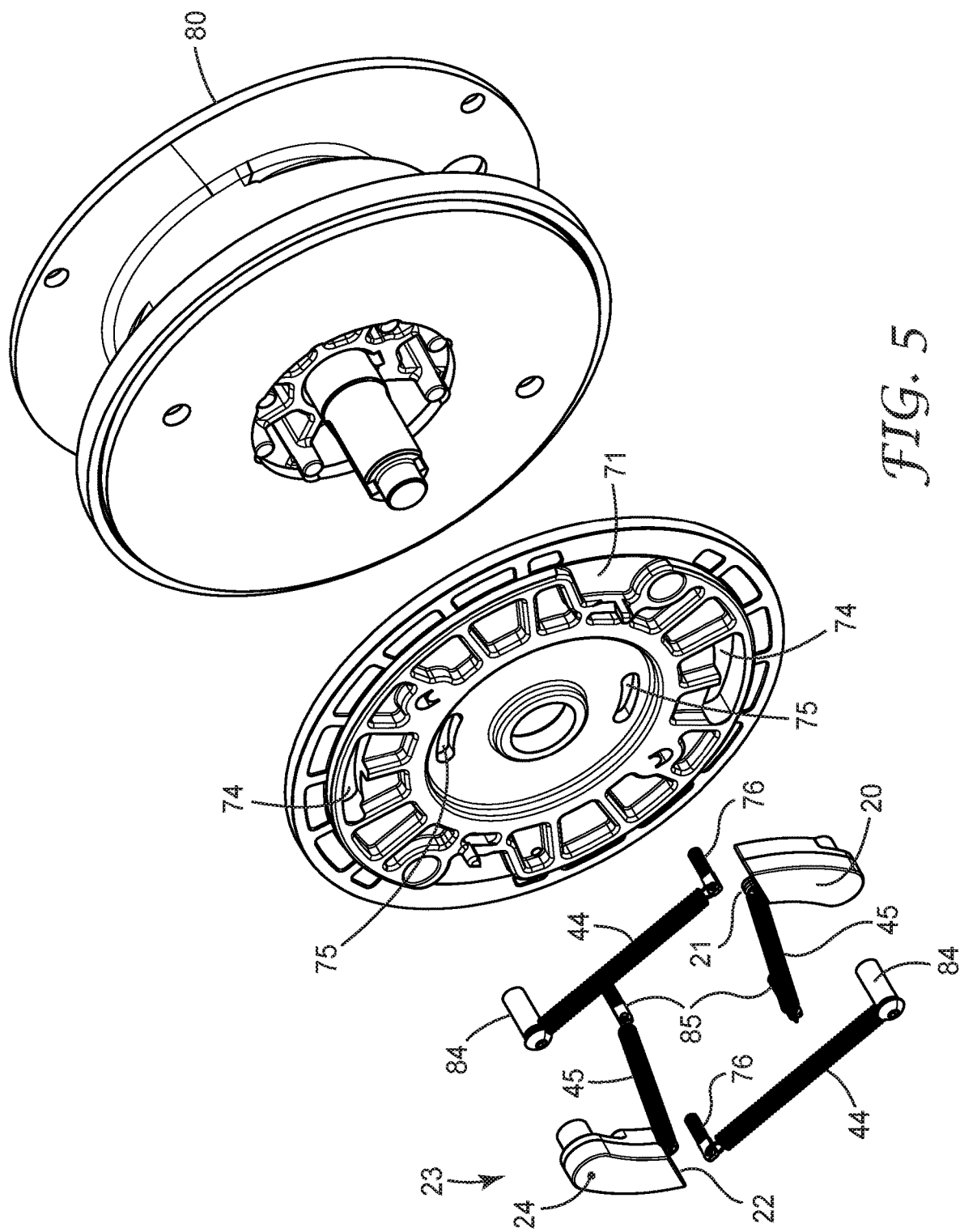
FIG. 5 is a further-exploded view of the items of FIG. 4.

In many embodiments, the one or more pawls 20 are pivotally arranged (e.g. are pivotally mounted on a pawl-support plate 70) so that they can pivotally move between a disengaged position and an engaged position. Any such pawl 20 will be biased so that in ordinary use of the fall-protection apparatus, an engaging end 22 of a pawl 20 is urged into a disengaged position in which it does not engage with any component (e.g. a ratchet tooth) that would limit the rotation of the drum. In the depicted embodiment, this is performed by use of biasing members (springs) 45 as seen in FIGS. 4 and 5; however, any suitable biasing mechanism or element can be used. The biasing of the pawls into a disengaged position allows the drum to rotate freely thus allowing extension and retraction of the safety line in response to movements of a human user of the fall-protection apparatus as the user goes about their workplace activities. In the event that the drum begins to rotate above a predetermined threshold value of velocity or acceleration, at least one pawl 20 is motivated (overcoming the biasing force of e.g. spring 45) into an engaged position in which the engaging end 22 or 52 of the pawl is able to physically contact a tooth of a ratchet to slow and/or stop the rotation of the drum. Exemplary ratchets 90 and teeth 91 thereof are depicted in exemplary embodiment in FIGS. 2 and 11; however, it will be appreciated that many ratchet arrangements are possible, as is discussed in detail later herein.

In various Figures herein, some pawls are depicted in an engaged position while others are depicted in a disengaged position. It will be appreciated that when the apparatus is in a non-fall situation (e.g. with the drum rotating very slowly or not at all), all such pawls will typically be in a disengaged position. Various numerical relationships and calculations that are presented later herein, will be understood to be obtained with apparatus 1 in a condition in which all such pawls are in a nominal, fully disengaged position. In some embodiments, one or more physical stops may be provided e.g. on the front surface 71 of the pawl-support plate, so that the biasing causes each pawl to be "snugged" against the physical stop, e.g. in a fully disengaged position.

In use of a rotationally-activated braking device as disclosed herein, the engaging of at least one pawl with a tooth of a ratchet will at least slow, e.g. will arrest, the rotation of the drum. With some such braking devices, the rotationally-activated braking device may bring the drum to a "hard stop" in which the rotation of the drum ceases essentially at the instant that the pawl engages the tooth. In many such cases, the safety line of such an apparatus may include a so-called shock absorber (e.g. a tear web or tear strip) to minimize the force experienced by a human user as the user is brought to a halt. (It will be understood that the term "hard stop" is used for convenience in distinguishing such a stop from a more gradual stop that relies on the use of a friction brake as described later herein; the term "hard stop" does not imply that the user is subjected to, e.g., excessively hard forces in being brought to a halt.) With some other such braking devices (e.g. as depicted in the Figures herein), the rotationally-activated braking device relies on a friction brake that, rather than bringing the drum near-instantly to a "hard stop", brings the drum to a halt in a more gradual manner as described in detail later herein. This can minimize the force experienced by a human user as a fall is being arrested, e.g. without necessarily requiring the presence of a shock absorber in the safety line.

In use of exemplary fall-protection apparatus 1, an upper, anchorage end 108 of the apparatus may be connected (e.g. by way of connection feature 114) to a secure anchorage (fixed point) of a workplace structure (e.g., a girder, beam or the like). The distal end of line 115 may then be attached (e.g., by way of hook 116) to a harness worn by a worker. As the human user moves away from the fixed anchorage, drum 80 rotates in a first direction so that line 115 is extended (paid out) from within housing 111. As the user moves toward the fixed anchorage, drum 80 rotates in a second, opposite direction (e.g. under the urging of a torsion spring or other biasing member), so that line 115 is automatically self-retracted within housing 111 and wound upon drum 80. During such user activities, pawl(s) 20 are biased (e.g. by aforementioned biasing elements 45) so that an engaging end 22 of a pawl 20 does not engage a tooth 91 of a ratchet 90 of the rotationally-activated braking device. In the event that the human user falls and causes line 115 to begin rapidly extending from housing 111, an engaging end 22 of a pawl 20 is caused to move (i.e., is actuated) to a position in which it can engage with a ratchet tooth by the arrangements disclosed herein, whereupon the falling of the worker is arrested as discussed in detail herein.

Velocity-Actuated Pawls

As disclosed herein, a fall-protection apparatus 1 comprises at least one pawl 20 that is a velocity-actuated pawl, mounted on a pawl-support plate 70. As shown in exemplary embodiment in various Figures herein, in some embodiments the at least one velocity-actuated pawl 20 may take the form of a pair of pawls 20. In some embodiments the pawls 20 of such a pair may be located in circumferentially-opposing positions from each other (i.e., on opposite sides of the axis of rotation 81 of drum 80 and pawl-support plate 70, when viewed along axis of rotation 81) as evident e.g. in FIG. 6.

Figure 6:
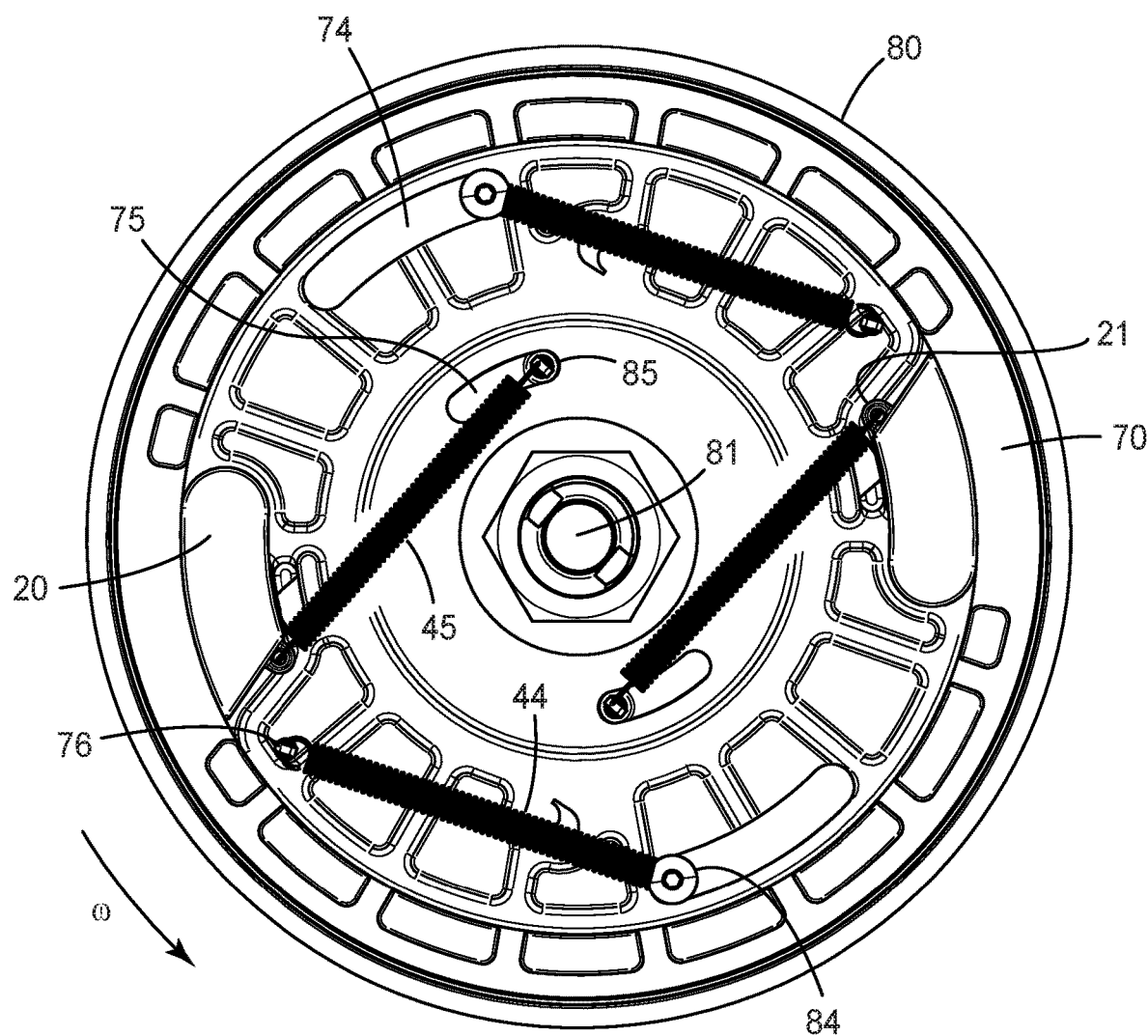
FIG. 6 is a plan view of a drum and a pawl-support plate with a pair of velocity-actuatable pawls pivotally mounted thereon, with the pawl-support plate in a first position and with the pawls in a fully disengaged position.

As is evident from the view of FIG. 6, the at least one pawl 20 is configured so that upon rotation of pawl-support plate 70 around its axis of rotation 81, first pawl(s) 20 will follow a generally circular orbital path around axis of rotation 81. When drum 80 and pawl-support plate 70 are rotating at a velocity below a particular threshold value, pawl(s) 20 will be in a first, disengaged position. When drum 80 and pawl-support plate 70 are stationary (meaning not rotating about axis 81), all such pawls will typically be in a fully disengaged position, meaning that they are moved as far in the disengaging direction as they can be moved, by their respective biasing members.

A velocity-actuated pawl 20 is a pawl that is actuated (i.e., caused to move from a first, disengaged position, toward, and into, a second, engaged position) when the velocity of the pawl 20 along its orbital path exceeds a predetermined threshold value. For convenience, the velocity of the pawl will be referred to herein as rotational velocity. This will be understood to refer to the velocity of a pawl along its orbital path as dictated by the rotation of the pawl-support plate; this does not refer to any (partial) rotation of the pawl relative to the pawl-support plate (about a pivot point at which the pawl is pivotally connected to the pawl-support plate). In many embodiments, a velocity-actuated pawl 20 will not be not significantly actuated by any acceleration that the pawl may be experiencing; however, such acceleration may modulate (modify) the velocity-response of the pawl, as discussed in detail later herein.

As will be appreciated from e.g. FIG. 4, in some embodiments a velocity-actuated pawl 20 can be biased toward a first, disengaged position, by way of a mechanical biasing member, e.g. a spring 45. Such a spring 45 may have a first end that is attached to the pawl 20 at an attachment point 21, and a second, opposing end that is attached to a post 85. Such a spring 45 will be referred to herein as a pawl-biasing spring, with such a post 85 being referred to herein as a pawl-biasing-spring post. In some embodiments, such a post 85 may be fixed on drum 80 and may protrude axially from drum 80 so as to extend through a slot 75 in pawl-support plate 70, as seen e.g. in FIGS. 5 and 6.

In the depicted embodiment, pawl-biasing spring 45 is a coil spring that is acting in tension. Exceeding a predetermined rotational velocity threshold will cause pawl 20 to overcome the biasing force of spring 45 so as to move toward a second, engaged position, as discussed in detail herein. It will be appreciated that any suitable biasing item, member, mechanism, etc. may be used for biasing a velocity-actuated pawl 20. For example, a pawl-biasing spring that is acting in compression rather than tension may be used. Or, a torsion spring may be used. In some embodiments, a magnetic biasing mechanism may be used, e.g. by way of mounting one or more magnets in suitable locations on pawl-support plate 70 and/or on one or more pawls.

In many embodiments, any or all such pawls 20 will be pivotally mounted on (e.g. pivotally attached to) pawl-support plate 70 at a pivot point. Methods of achieving such arrangements will be readily understandable to ordinary artisans and need not be explored in further detail herein. Moreover, it will be appreciated that a system of pawls of the general type disclosed herein may include various ancillary components, features and arrangements. Again, ordinary artisans will be readily able to establish such ancillary features.

The functioning of a velocity-actuated pawl will be discussed in further detail in reference to FIG. 10, which is a simplified representation of a pawl-support plate 70 bearing an exemplary velocity-actuated pawl 20 (shown in a disengaged position). Various features and components (e.g. biasing springs and so on) are omitted from FIG. 10 for ease of presentation of the relevant features of pawl 20.

As mentioned earlier herein, velocity-actuated pawl 20 is biased so that the engaging end 22 of pawl 20 is urged toward (e.g. maintained in) a disengaged position. Upon rotation of the rotatable drum above a predetermined threshold of rotational velocity (ω), engaging end 22 of pawl 20 is urged away from the disengaged position and into an engaged position in which it can engage a tooth of the ratchet. In arrangements of the general type shown in FIG. 10, engaging end 22 of pawl 20 will move radially outward in moving from a disengaged position to an engaged position. (Strictly speaking, pawl 20 will not "engage" with a ratchet tooth until its engaging end 22 actually contacts the tooth. However, for purposes of description, a pawl will be considered to be in an engaged position upon the pawl having been actuated so that its engaging end is in a position (e.g. having moved radially outward) in which it will contact a ratchet tooth upon continued motion of the pawl along its orbital path.)

Pawl 20 comprises a pivot point 24 that is aligned with (and defined by) a pivotable connection of pawl 20 with pawl-support plate 70. Pivot point 24 is generally proximate the "trailing" end 23 of pawl 20, which is the end opposite engaging end 22, which is the "leading" end of pawl 20 as pawl plate 70 rotates (counterclockwise, in the depicted Figures). Pivot point 24 will follow an orbital path 25 as the drum (not shown) and pawl-support plate 70 rotate about axis of rotation 81. Pawl 20 also comprises a center of mass 26 that likewise follows an orbital path 27 as the drum and the pawl-support plate rotate about axis of rotation 81.

In a velocity-actuated pawl 20, center of mass 26 and pivot point 24 are at least generally radially aligned with each other (in other words, center of mass 26 and pivot point 24 are at least generally the same radial distance from axis of rotation 81). By this is meant that center of mass 26, and pivot point 24, are positioned so that the orbital path 27 followed by center of mass 26, and the orbital path 25 followed by pivot point 24, at least generally coincide. In the exemplary depiction of FIG. 10, orbital paths 25 and 27 coincide exactly; however, this is not necessarily required, as discussed below.

As indicated in FIG. 10, the center of mass 26 of pawl 20 is circumferentially offset from pivot point 24 of pawl 20, along the orbital path 27/25 of center of mass 26/pivot point 24. This circumferential offset along orbital path 27/25 is indicated by bracket 28. As pawl-support plate 70 rotates about axis 81, a radially-outward centrifugal force (indicated by block arrow 29) will develop. The offset between this force and the pivot point 24 of the pawl will have the effect that pawl 20 will rotate about pivot point 24 so that center of mass 26 moves generally radially outward, approximately in the direction indicated by block arrow 29. Engaging end 22, being on the opposite side of center of mass 26 from pivot point 24, will move radially outward to an even greater extent.

Thus, a rotational velocity of plate 70 above a predetermined threshold will cause engaging end 22 of pawl 20 to be urged generally radially outward toward, and eventually into, an engaged position. The value of this threshold can be set partially by the above-discussed biasing force that is applied to pawl 20, but will typically also be affected by various parameters (e.g. mass, mass distribution, and so on) of pawl 20.

The above explanations have been couched in terms of "centrifugal force" acting to urge the center of mass 26 of pawl 20 generally radially outward. Ordinary artisans will understand that, strictly speaking, centrifugal force is a fictitious or "pseudo" force. What actually occurs is that the inertia of center of mass 26 tends to cause center of mass 26 to deviate radially outward (i.e. to attempt to continue in a straight path) rather than following arcuate orbital path 27. However, the concept of centrifugal force is well-established and is perfectly suited for discussing the motion of a pawl 20 using a frame of reference that rotates with pawl-support plate 70 and pawl 20. So, for convenience of description, the term centrifugal force is used in the discussions herein.

The circumferential offset between center of mass 26 and pivot point 24, along orbital paths 25/27, can be any suitable value. Such an offset may be characterized e.g. by way of an offset angle (angular arc) σ measured from a vertex that coincides with axis of rotation 81, as indicated in FIG. 5. That is, angle σ is the included angle between imaginary lines 31 and 32 that respectively extend from pivot point 24 to axis of rotation 81, and from center of mass 26 to axis of rotation 81. In various embodiments, such an angular arc may be at least 1, 2, 4, 6, 8, or 10 degrees. In further embodiments, such an angular arc may be at most 20, 18, 16, 14 or 12 degrees. By way of a specific example, the circumferential offset angle σ shown in the exemplary design of FIG. 10, is approximately 12 degrees. In some instances, such an offset may be characterized by the distance between center of mass 26 and pivot point 24, the distance being measured along (arcuate) orbital path 27 of center of mass 26. In various embodiments, such a distance may be at least 1, 2, 4, or 8 mm; in further embodiments, such a distance may be at most 50, 20, 15, or 10 mm.

The fact that center of mass 26 and pivot point 24 are at least generally radially aligned with each other as noted above means that center of mass 26 at least generally follows the same orbital path as pivot point 24. (In other words, the above-mentioned orbital paths 25 and 27 will at least generally coincide, as evident e.g. in FIG. 10.) This has the effect that any acceleration (i.e. a change in the absolute rotational velocity) of pawl 20 will have little or no tendency to urge the center of mass, or the engaging end 22, of pawl 20, either generally radially outward or inward. Pawl 20 is thus responsive to the absolute rotational velocity of pawl 20 along its orbital path, but is not significantly responsive to acceleration along this orbital path.

It may not be not necessary for pivot point 24 and center of mass 26 to be "exactly" radially aligned with each other (that is, it may not be not necessary that orbits 25 and 27 must coincide "exactly") in order to provide that pawl 20 is not significantly actuated by acceleration. That is, in any real-life apparatus, small adjustments may be made in view of the fact that, for example, pivot point 24 may not be a geometrically perfect point, frictional effects may occur, gravitational effects may occur, inertial effects may occur (e.g. due to the mass of pawl plate 70 and/or the mass of drum 80 and any safety line 115 wound thereon), and so on. So in some instances, it may be acceptable, or even desirable, that there be a deliberate (although typically small) mismatch between orbits 25 and 27. Thus the condition is applied as stated above, that pivot point 24 and center of mass 26 are "at least generally" radially aligned with each other. By this is meant that the orbital path 27 of center of mass 26 exhibits a diameter that differs from the diameter of orbital path 25 of pivot point 24, by less than plus or minus 10%. In various embodiments, the orbital path 27 of center of mass 26, may exhibit a diameter that is within plus or minus 8, 5, 3, 2, 1, or 0.5% of the diameter of orbital path 25 of pivot point 24. Any such measurement will be performed with pawl plate 70 stationary and with pawl 20 in a fully disengaged position. The diameter of orbital path 25 will be used as the reference basis (denominator) for the calculation of the above percentage.

The above discussions have presented arrangements in which a pawl 20 is velocity-actuated, while exhibiting little or no direct response to acceleration (although, as discussed below, the velocity-response of the pawl will be modulated by a sufficiently high acceleration). In brief summary, this can be achieved by providing a pawl with a center of mass that is radially aligned with, and circumferentially offset from, the pawl's pivot point. As noted above, these relationships need not be "exact". In fact, ordinary artisans will appreciate that, for example, when a velocity-actuated pawl has moved (e.g. radially outward) toward an engaged position, the center of mass will no longer be as radially aligned with the pivot point as it was when the pawl was in the fully disengaged position. Thus after a velocity-actuated pawl has moved out of its fully disengaged position, it may be slightly more affected by acceleration. Ordinary artisans will appreciate that any such effects will be transient in nature (e.g. only coming into play when a pawl is already well on its way to an engaged position). Moreover, the present work has indicated that with pawls designed and arranged in the general manner disclosed herein, any such phenomena may be rather small in magnitude (e.g. insignificant).

Further details of velocity-actuated pawls (and ways in which such pawls can be distinguished from e.g. acceleration-actuated pawls) are described in U.S. Provisional Patent Application No. 62/705,533; entitled Fall-Protection Apparatus Comprising Dual-Actuatable Braking Device, which is filed evendate herewith and is incorporated by reference herein in its entirety.

Acceleration-Modulation

The discussions above reveal that a velocity-actuated pawl 20 as disclosed herein is configured so that it is not significantly actuated by any acceleration that the pawl (or the pawl-support plate 70 to which it is attached) experiences. However, according to the arrangements herein, the velocity-actuation of the pawl can be modulated by an acceleration that the pawl-support plate 70 experiences. This can be achieved by providing by mounting the pawl 20 on a pawl-support plate 70 that is rotatable relative to drum 80, through a predetermined range between at least a first position and a second position relative to drum 80. When the pawl-support plate is in the first position, rotation of the drum and plate above a predetermined first threshold value of rotational velocity overcomes the pawl-biasing force (of e.g. a pawl-biasing spring 45) and causes the engaging end of the pawl to be urged by centrifugal force into an engaged position in which it can engage a tooth of the ratchet. When the pawl-support plate is in the second position, rotation of the drum above a predetermined second threshold value of rotational velocity overcomes the pawl-biasing force and causes the engaging end of the pawl to be urged by centrifugal force into an engaged position in which it engages a tooth of the ratchet.

As disclosed herein, the predetermined second threshold value of rotational velocity is lower than the predetermined first threshold value of rotational velocity. The pawl-support plate is biased toward the first position and is rotatable relative to the drum from the first position to the second position, upon the pawl-support plate experiencing a rotational acceleration that is above a predetermined threshold value. Thus, when the pawl-support plate is experiencing a low level of acceleration, the pawl-support plate, being biased toward its first position, will remain in the first position and the pawl can only be actuated by exposing the pawl to the first, higher threshold of velocity. If the pawl-support plate is experiencing a sufficiently high level of acceleration (sufficient to overcome the biasing of the pawl-support plate toward the first position), the pawl-support plate will rotate slightly relative to the drum, into the second position. With the pawl-support plate in the second position, the pawl can be actuated by exposing the pawl to the second, lower threshold of velocity. In other words, the pawl can be actuated at a lower velocity, if the pawl-support plate is experiencing high acceleration. The advantages of such arrangements will be readily apparent to ordinary artisans.

One general approach to achieving such functionality is depicted in exemplary manner in the Figures herein. In the depicted exemplary embodiment (as seen e.g. in FIGS. 4-6), pawl-support plate 70 is biased by way of at least one plate-biasing spring 44. One end of spring 44 is attached to pawl-support plate 70, by way of being attached to a post 76 that is fixed to plate 70, e.g. that protrudes axially from major surface 71 of plate 70. The other end of spring 44 is attached to a plate-biasing-spring post 84 that is fixed to drum 80. Post 84 protrudes axially from drum 80 so as to extend through an elongate slot 74 in pawl-support plate 70, as seen e.g. in FIGS. 4 and 5. Elongate slot 74 extends at least generally circumferentially along pawl-support plate 70 as seen most easily in FIG. 6.

Pawl 20, in turn, is biased by way of a pawl-biasing spring 45. One end of spring 45 is attached to pawl 20 at attachment point 21. The other end of spring 45 is attached to a pawl-biasing-spring post 85 that is fixed to drum 80. Post 85 protrudes axially from drum 80 so as to extend through an elongate slot 75 in the pawl-support plate 70, as seen e.g. in FIGS. 4 and 5. Elongate slot 75 extends at least generally circumferentially along pawl-support plate 70 as seen most easily in FIG. 6. (Elongate slots 75 and 74, through which posts 85 and 84 respectively protrude, will be referred to as "first" and "second" slots herein.)

Figure 7:
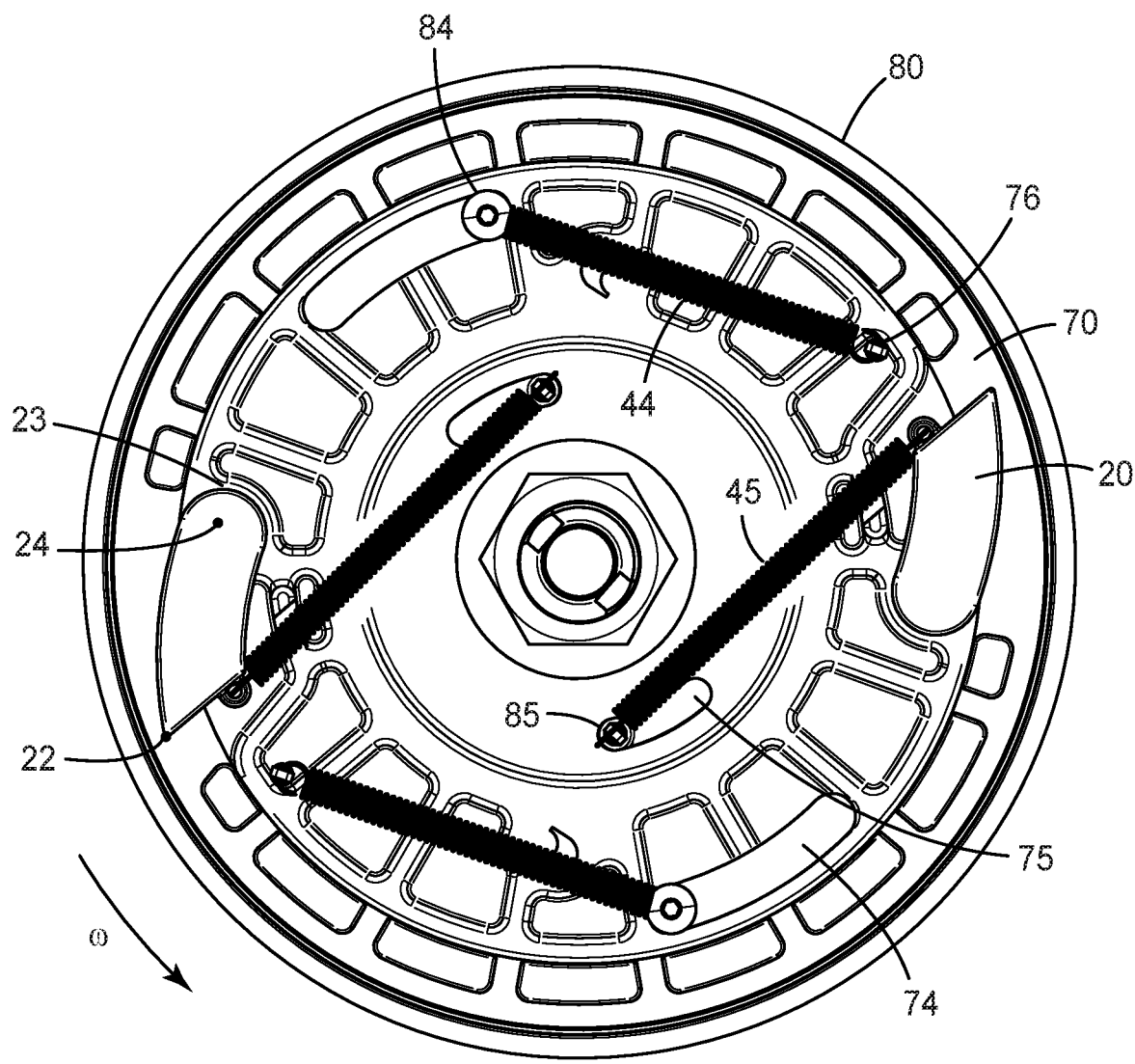
FIG. 7 is a plan view of the items of FIG. 6 with the pawl-support plate in the first position and with the pawls in an engaged position.

The velocity-modulation that can be achieved by such an arrangement can function as follows (noting that the depicted exemplary arrangement includes two pawls, two springs 44, two springs 45, and so on). When pawl-support plate 70 is experiencing little or no acceleration, pawl-support plate 70 will be biased by the action of plate-biasing spring 44, into its first position relative to drum 80 as shown in FIG. 6. As long as the acceleration and velocity to which the plate and pawls are exposed remain low (e.g., in ordinary use of the apparatus) the plate 70 will remain in this first position relative to drum 80 and will rotate in unison with drum 80. Upon a sufficiently high velocity occurring (i.e. above the above-mentioned predetermined first threshold)

the centrifugal force that is developed on the pawls will overcome the biasing force of pawl-biasing springs 45 and the pawls will be urged into an engaging position as shown in FIG. 7. (No ratchet or tooth thereof is shown in FIG. 6 or 7 in order that other features can be clearly shown.)

Figure 8:
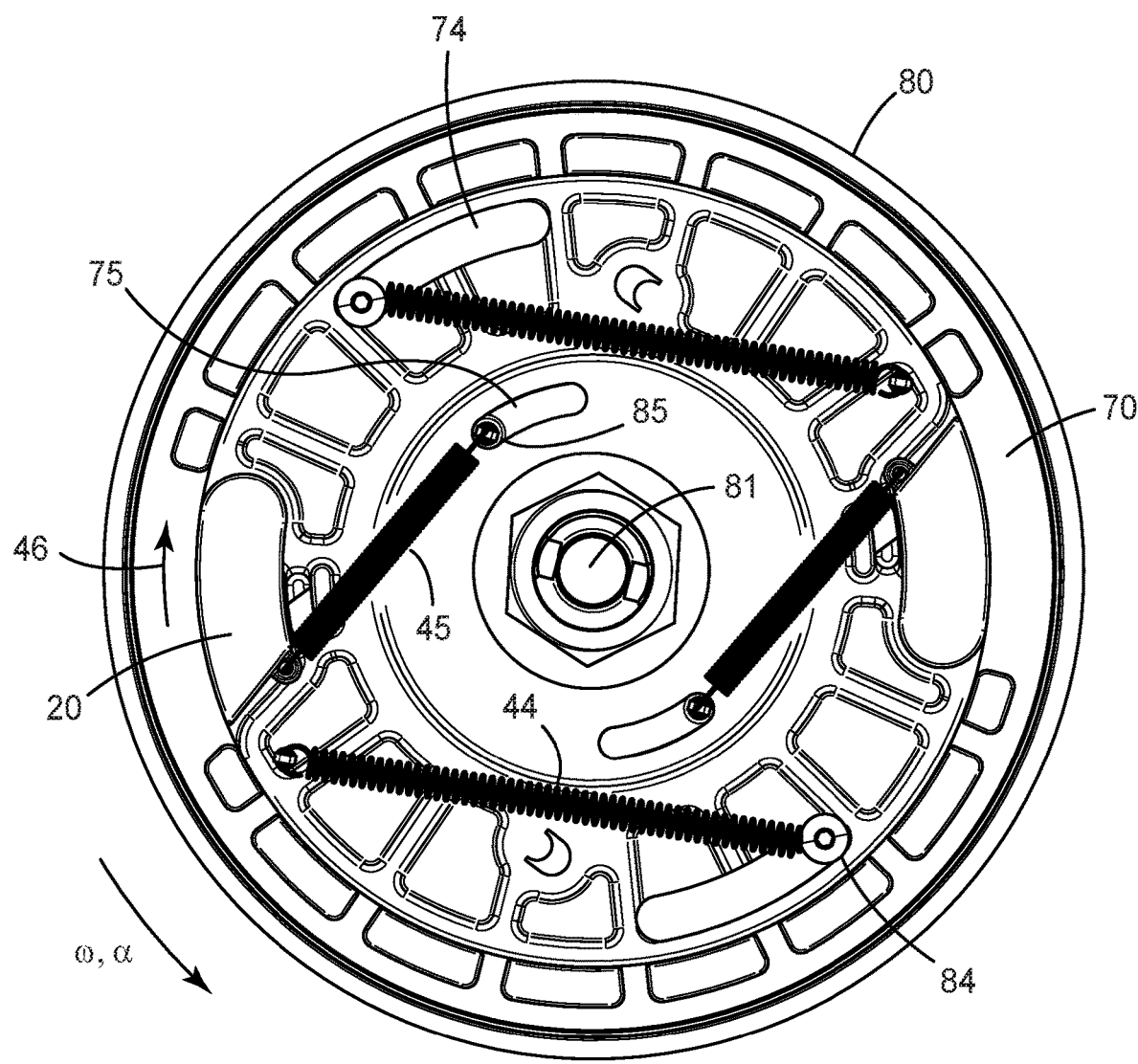
FIG. 8 is a plan view of a drum, and a pawl-support plate with a pair of velocity-actuatable pawls pivotally mounted thereon, with the pawl-support plate in a second position and with the pawls in a fully disengaged position.

On the other hand, if drum 80 is subjected to a sufficiently high acceleration (in the direction that drum 80 is rotating, indicated as acceleration a in FIG. 8), the mass, and consequent inertia, of pawl-support plate 70 and of the pawl(s) mounted thereon will cause plate 70 to "lag" behind drum 80 as drum accelerates. Thus as shown in FIG. 8, upon sufficiently high acceleration of drum 80 in the direction indicated by arrow α, plate 70 will rotate relative to drum 80, in an opposing direction indicated by arrow 46. (It will be understood that this circumferentially-rearward motion of plate 70 is relative to drum 80, notwithstanding that the overall rotational motion of plate 70 may still be circumferentially-forward). The biasing action of plate-biasing spring 44 (as dictated by its spring constant, orientation, etc., as discussed below), in combination with the mass of the plate and pawls, and so on, can be configured so that an acceleration that is above a prechosen value will overcome the biasing action and will result in the movement of plate 70 relative to drum 80.

This partial rotation of plate 70 relative to drum 80 will modify the biasing of each pawl 20. That is, since one end of pawl-biasing spring 45 is attached to pawl 20 which is mounted on plate 70, and the other end of pawl-biasing spring 45 is attached to drum 80, the rotation of plate 70 relative to drum 80 will change the length of spring 45, as can be seen by comparing FIG. 6 (in which plate 70 is in the first position) to FIG. 8 (in which plate 70 is in the second position).

Figure 9:
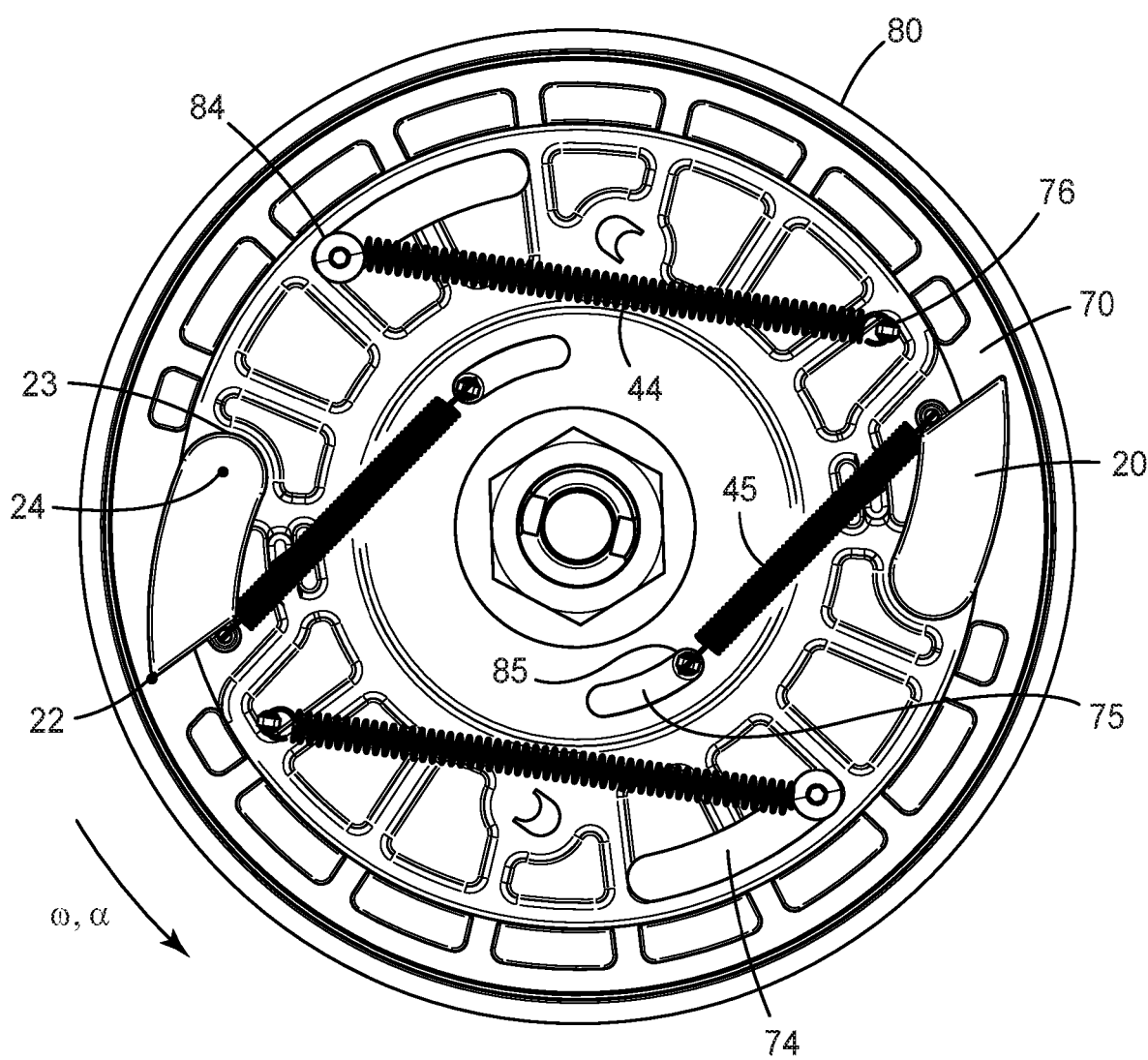
FIG. 9 is a plan view of the items of FIG. 8 with the pawl-support plate in the second position and with the pawls in an engaged position.

With plate 70 in the second position, the length of pawl-biasing spring 45 is smaller than it is with plate 70 in the first position. Thus, in accordance with the general precepts of Hooke's law, less centrifugal force (hence a lower rotational velocity of pawl 20) will be required to overcome the biasing force imparted by spring 45. So, with plate 70 in the second position, pawl 20 can be actuated (urged into an engaging position) as shown in FIG. 9, at a second threshold velocity that is lower than the first threshold velocity that is needed to actuate the pawl when plate 70 is in the first position.

Thus in summary, when drum 80 experiences a sufficiently high acceleration (such as in the event of a user fall), plate 70 will be slightly, momentarily "left behind" by drum 80, and in doing so will move from a first position to a second position, thus changing the biasing that is applied to pawl 20. It will be appreciated that this is achieved by leveraging the actual mass of plate 70 (and of pawls 20 mounted thereon), rather than by, for example, installing a separate, additional massive element that e.g. can rotate relative to plate 70.

The effect of such rotation of plate 70 from a first position to a second position may be quantitatively characterized in terms of the length of pawl-biasing spring 45. In various embodiments, the ratio of the length of pawl-biasing spring 45 when plate 70 is in the second position, to the length of pawl-biasing spring 45 when plate 70 is in the first position, may be less than 95, 90, 85, 80, 75, 70, 65, or 60%. In further embodiments, this ratio may be at least 30, 40, 50, 60, or 70%. (In characterizing such ratios, the length of the "active" portion of the spring will be measured). By way of a specific example, the ratio of the length of spring 45 when plate 70 is in the second position as shown in FIG. 8, to the length of spring 45 when plate 70 is in the first position as shown in FIG. 6, is approximately 75%.

In many embodiments, pawl-support plate 70 will be biased in a circumferentially forward direction (that is, in a "leading" direction) relative to drum 80. In ordinary use of the apparatus, plate 70 will typically remain in this position (e.g., "snugged" against one or more physical stops 84 or 85, as depicted in FIG. 6) the majority of the time. Upon plate 70 experiencing a rotational acceleration that is above the predetermined threshold value, plate 70 will rotate through the predetermined range of rotation (from the first position to the second position) in a circumferentially rearward ("trailing") direction relative to the drum, as shown in FIG. 8. In other words, plate 70 will rotationally "lag" drum 80 as described above, in a way that will allow the pawls to be actuated at a lower velocity than in the absence of any such movement of plate 70 relative to drum 80.

Ordinary artisans will appreciate that in some cases the presence of a pawl-biasing spring 45 may slightly affect the biasing of pawl-support plate 70 with respect to potential rotation of plate 70 relative to drum 80. For example, in the view of FIG. 6, pawl-support plate 70 is biased in a counterclockwise direction by plate-biasing springs 44. Pawl-biasing springs 45, by virtue of being attached to pawls 20 that are mounted on plate 70, will act to bias plate 70 at least slightly in the opposing direction (clockwise, in the view of FIG. 6). However, these items can be configured so that any biasing force exerted on plate 70 by pawl-biasing springs 45 may be minimal in comparison to the biasing force exerted on plate 70 by plate-biasing springs 44. This may be at least partially accomplished, for example, by appropriate choice of the spring constants and/or lengths of the respective springs. However, this may also be at least partially accomplished by appropriate choice of the locations and/or orientations of the springs (or other biasing element(s)).

Thus in some embodiments, a pawl-biasing spring 45 may exhibit a long axis that is oriented at a first angle with respect to a radially-inward-outward direction of the pawl-support plate. A plate-biasing spring 44 may exhibit a long axis that is oriented at a second angle with respect to the radially-inward-outward direction of the pawl-support plate. Based e.g. on inspection of e.g. FIG. 6, it will be appreciated that orienting the long axis of a pawl-biasing spring 45 relatively close to a radially inward-outward direction of the pawl-support plate 70 can provide that the force exerted by spring 45 on plate 70 will have a vector component in the circumferential direction that is extremely small. So, a pawl-biasing spring that is oriented at such an angle may have only a minor effect in urging the pawl-support plate 70 to rotate in a circumferential direction. (In the limit of a pawl-biasing spring 45 that is oriented exactly along a radially inward-outward direction, the spring would exert essentially no force on the pawl-support plate to rotate.)

Thus, in various embodiments, the above-cited second angle may be greater than the above-cited first angle by at least 5, 10, 15, 20, 25, or 30 or more degrees (meaning that the pawl-biasing spring is oriented closer to the radially inward-outward direction than is the plate-biasing spring). All such angles will be measured from a vertex that is coincident with the actual point of attachment of the spring to the pawl support plate (e.g. at post 76 for spring 44) or the pawl (e.g. at attachment point 21 for spring 45), with the drum and pawl-support plate stationary and with the pawl-support plate and the pawls all in their nominal positions (as in e.g. FIG. 6). By way of a specific example, in the exemplary arrangement of FIG. 6, plate-biasing spring 44 is oriented at an angle of approximately 40 degrees relative to the radially inward-outward direction, while pawl-biasing spring 45 is oriented at an angle of approximately 25 degrees relative to the radially inward-outward direction. In this case the second angle is thus approximately 15 degrees greater than the first angle.

Any such arrangements can have the result that, when drum 80 is stationary and the pawl(s) in a fully disengaged position, a second biasing force vector that is exerted on pawl-support plate 70 by the plate-biasing spring(s) 44 to urge plate 70 to rotate, will be greater than any first biasing force vector that is exerted on pawl-support plate 70 by the pawl-biasing spring(s) 45 to urge plate 70 to rotate in the opposite direction. In various embodiments, the second biasing force may be greater than the first biasing force by a factor of at least 3, 5, 7, 10, or 15.

In many embodiments, the predetermined range of rotation of pawl-support plate 70 relative to drum 80 between the first position and the second position will be a limited range, e.g. less than 180, 140, 100, 60, or 40 degrees. In some embodiments, the length of second elongate slot 74 of pawl-support plate 70, in combination with the presence of plate-biasing-spring post 84 that is fixed to drum 80 and extends through slot 74, can define the predetermined range of rotation (between the first and second positions) of pawl-support plate 70 relative to drum 80. That is, post 84 may serve as a physical stop that, upon contacting a terminal end of elongate slot 74, will prevent any further motion of plate 70 relative to drum 80. In some embodiments, the length of first elongate slot 75 of drum 80, in combination with the presence of pawl-biasing-spring post 85 that is fixed to drum 80 and extends through slot 75, can define this predetermined range of rotation of pawl-support plate 70 relative to drum 80. That is, post 85 may serve as a physical stop that, upon contacting a terminal end of elongate slot 75, will prevent any further motion of plate 70 relative to drum 80. In some embodiments, slots 74 and 75 may be configured so that they both, in combination, serve to define the predetermined range of rotation of plate 70 relative to drum 80. That is, they may both occupy a very similar or identical angular arc, as is the case in the exemplary design of FIG. 6.

In various embodiments, the length of elongate slot 74 and/or elongate slot 75 can be set so that this predetermined range of rotation of plate 70 relative to drum 80 is at least 5, 10, 15, 20, or 25 degrees. In further embodiments, the length of elongate slot 74 and/or elongate slot 75 can be set so that this predetermined range of rotation is at most 80, 70, 60, 50 or 40 degrees. (The slots 74 and 75 depicted in FIG. 6 establish a predetermined range of rotation of approximately 30 degrees.)

In some embodiments, e.g. if posts 84 and/or 85 are to define the predetermined range of rotation, posts 84 and/or 85 may be part of a load-bearing (force-transmitting) path between drum 80 and pawl-support plate 70. Thus, any such posts may be made of any suitable material, e.g. steel. In some embodiments the far end of each post (e.g., the far right end of posts 84 and/or 85 as shown in FIG. 4) may be seated in a receptacle of drum 80, which receptacle may be reinforced to enhance the load-bearing and load-transmitting properties of the interface between the drum and the post. Of course, in some embodiments such posts may serve purely for the purposes of biasing as described earlier herein; if so, some other combination of posts and apertures may be provided that limit the range of rotation of plate 40 relative to drum 80, and/or that serve as part of a load-bearing path between plate 40 and drum 80. Drum 80 may be made of any material that exhibits properties commensurate with the desired strength. In various embodiments, drum 80 may be made of a molded polymer such as e.g. glass-fiber-reinforced nylon; or, drum 80 may be made of a metal such as e.g. cast aluminum. Similarly, pawl-support plate 70 may be made of any material with suitable properties, e.g. steel.

It will be appreciated that the above arrangements are exemplary and based on the guidance provided here, variations will be readily apparent. For example, rather than using one or more tensioned coil springs 44 as a plate-biasing member as in the Figures herein, pawl-support plate 70 may be biased relative to drum 80 e.g. by way of a torsion spring or similar item. Furthermore, the Figures herein depict an exemplary embodiment in which pawls 20 are provided in pairs, as are the various springs, elongate slots, posts, and so on. In various embodiments, any suitable number of pawls and corresponding features and components may be used, e.g. 1, 3, or 4. In some embodiments, a spacer (e.g. a washer or disk) 87 of a suitable low-friction material (e.g., poly (oxymethylene)) may be provided between major side 72 of pawl-support plate 70 and a major surface 83 side of a sidewall of drum 80 as shown in exemplary embodiment in FIGS. 2 and 4. Such an arrangement may enhance the ability of plate 70 to rotate relative to drum 80 in upon the onset of sufficient acceleration. In some embodiments, a sidewall of drum 80 may be comprised of such a low-friction material.

The above discussions have been couched in terms of the velocity-actuation of a pawl 20 being modulated by a sufficient rotational "acceleration" that the pawl-support plate 70 is subjected to. In this regard it is noted that, strictly speaking, any body (e.g. a plate 70, or a pawl 20) that is following an orbital path is continuously experiencing acceleration, due to the change in the direction of motion. (In other words, velocity is a vector quantity, and any change in the magnitude or direction of the velocity, corresponds to acceleration.) Those of ordinary skill will appreciate that the terms "acceleration" and "rotational acceleration" as used herein specifically denote so-called tangential acceleration of a body that is following an orbital path. In other words, the acceleration that is used herein to modulate the velocity-response of a pawl, corresponds to a change in the magnitude of the velocity of a body along its orbital path; acceleration that results merely from the body following an orbital path at constant velocity (i.e., centripetal acceleration) has little or no effect.

The above-discussed first and second threshold values of velocity that causes a pawl 20 to be actuated can be set as desired. Each velocity threshold may be set to any suitable nominal value, e.g. 4, 6, 8, 10, or 12 feet per second. Each such a nominal value will correspond to the linear velocity experienced by the extended portion of safety line 115 (and thus to a user connected thereto). This can be converted to an actual value of rotational velocity of pawl 20 in view of the specific design parameters of the fall-protection apparatus (e.g. the diameter of the drum from which the safety line is unwound, the diameter of the orbit of the pawl, and so on). This can be used to set particular parameters (e.g. the spring constant of a biasing spring, and so on) to ensure that pawl 20 is actuated at first and second rotational velocities that correspond to the desired thresholds of velocity experienced by the user.

Similarly, the value of acceleration that modifies (modulates) the velocity-response of a pawl 20 (i.e., that causes pawl-support plate 70 to rotate relative to drum 80) can be set as desired. Such an acceleration threshold may be set to any suitable nominal value, e.g. 0.6 to 0.8 g. Such a nominal value will correspond to the linear acceleration experienced by the extended portion of safety line 115 (and thus to a user connected thereto). This can be converted to an actual value of acceleration of pawl-support plate 70 in view of the specific design parameters of the fall-protection apparatus. This can be used to set particular parameters (e.g. the spring constant of a plate-biasing spring, and so on) to ensure that pawl-support plate 70 rotates relative to drum 80 (in order to modulate the velocity-response of pawl 20) at a desired, predetermined acceleration that corresponds to the desired threshold of acceleration experienced by the user.

By way of a specific example, a rotationally-actuated braking device may be configured so that a pawl of the device is actuated at a nominal user-falling velocity in the range of e.g. 8, 10, or 12 feet per second if the acceleration is relatively low, and is actuated at a nominal user-falling velocity in the range of e.g. 4, 5, or 6 feet per second if the device is experiencing a nominal acceleration of e.g. 0.6 g or more.

The Figures presented herein illustrate exemplary arrangements in which a velocity-actuated pawl 20 is configured so that the engaging end of the pawl moves radially outward as the pawl is actuated toward an engaging position. (Such arrangements are typically used in combination with a radially-inward-facing ratchet as discussed below.) In other embodiments, a velocity-actuated pawl 20 may be configured so that the engaging end of the pawl moves radially inward as the pawl is actuated toward an engaging position. This may be achieved by, for example, positioning the center of mass of the pawl on the opposite side of the pivot point from the engaging end. Arrangements in which one or more velocity-actuated pawls are radially-inwardly-actuating can be used in combination with a radially-outward-facing ratchet as discussed below. Given the disclosures and design guidance presented herein, an ordinary artisan will be able to design a velocity-actuated, acceleration-modulated pawl that is radially-inward-actuating.

The above-discussed items may be made of any suitable material. For example, in some embodiments pawls 20 may be made of a metal such as steel. A pawl-support plate 70 may likewise be made of e.g. steel. A drum 80 may be made of e.g. a molded polymeric material such as e.g. glass-fiber-reinforced nylon, or a metal such as e.g. cast aluminum. Springs 44 and/or 45 may be made of e.g. any suitable material, e.g. stainless steel, zinc-coated steel, etc.

As noted, the arrangements herein cause at least one pawl to engage with a tooth 91 of a ratchet 90 as indicated in exemplary embodiment in FIG. 7. This can either stop the rotation of drum 80 directly (e.g. in the case of a "hard-stop" arrangement as mentioned earlier herein), or can activate a friction brake that brings the rotation of drum 80 to a halt. It will be appreciated that numerous variations of ratchets, and the manner in which one or more pawls engage with a tooth of the ratchet, are possible. For example, in the exemplary arrangements depicted in the Figures herein, the pawls are configured so that the engaging end 22 of a pawl 20 will travel from a disengaged position to an engaged position by moving generally radially outward. Such arrangements are typically used with a radially-inward-facing ratchet (meaning a ratchet with radially inward-facing teeth; e.g. a ratchet ring of the general type exemplified by ratchet 90 of FIG. 2 herein). However, in some embodiments a velocity-actuated pawl 20 may be configured so that the engaging end of the pawl travels from a disengaged position to an engaged position by moving generally radially inward rather than outward, as noted above. Such arrangements may be used with a ratchet (e.g. a ratchet ring or disc) that is radially-outward-facing; for example, a ratchet ring of the general type depicted as item 142 in FIG. 3 of PCT Published Application WO2019/012454.

In some embodiments a ratchet, rather than being provided e.g. as a toothed disk or ring that is made separately and inserted into a housing of a fall-protection apparatus, may be provided e.g. as an integral (e.g. molded, cast, or machined) feature of the housing of the apparatus. The PROTECTA fall-protection apparatus, available from 3M Fall Protection, Red Wing, MN, and discussed in more detail below, is an example of a product that uses this type of ratchet. Another possible variation in ratchet design is presented in U.S. Pat. No. 9,488,235, in which a ratchet takes the form of a single tooth ("stop member") that is provided as an integral part of a bracket (e.g., a load-bearing bracket) of a fall-protection apparatus. (The PROTECTA product, and the apparatus described in the '235 patent, rely on a completely different arrangement of pawls than disclosed herein; these items are cited merely to illustrate potential variations in ratchets.)

From the above discussions it will be clear that a ratchet of a rotationally-activated braking device can be any component (e.g. a toothed disk or ring or partial disk or partial ring, or a portion of a fall-protection bracket or housing) that presents at least one tooth that can be engaged by an engaging end of a pawl to initiate a braking operation of the rotationally-activated braking device. It is emphasized that the term "ratchet" is used for convenience of description; use of this term does not require that the ratchet and pawl(s) must necessarily be arranged e.g. so that relative rotation of these components is permitted in one direction but is precluded in the opposite direction. (However, the ratchet and pawl(s) can be arranged so that such functionality is provided if desired.)

In some embodiments a rotationally-activated braking device as disclosed herein can bring a drum to a "hard stop" (e.g. the braking device may rely on a ratchet that is non-rotatably fixed to the housing of the apparatus), as discussed earlier herein. However, in other embodiments a rotationally-activated braking device as disclosed herein will comprise (e.g. will work in concert with) a friction brake. In general, a friction brake will comprise at least one layer of friction material and at least one rotatable member, with a friction-braking surface of the layer of friction material being in contact (typically, at all times during ordinary use of the fall-protection apparatus) with a contact surface of the rotatable member. By a rotatable member is meant an item (e.g., a disk, ring, rotor, or the like) that is configured so that the member and the layer of friction material can be set into rotating motion relative to each other upon sufficient differential torque being applied to the layer of friction material and the rotatable member as the result of the engaging of a pawl with a ratchet of the rotationally-activated braking device. In many embodiments, the friction-braking surface of the layer of friction-braking material and the contact surface of the rotatable member are constantly pressed together to provide sufficient static frictional force that, as a human user moves about a workplace in ordinary use of the apparatus, there is no relative motion between the two surfaces. However, upon the engaging of a pawl with a ratchet of the rotationally-activated braking device, sufficient differential torque is generated to overcome the static frictional force, such that relative motion of the two surfaces (and hence relative motion of the rotatable member and the layer of friction material) may occur. The rotatable member and the layer of friction material are configured so that this relative rotation of the layer of friction material and the rotatable member will be slowed and/or brought to a halt by the frictional forces between the friction-braking surface of the layer of friction material and the contact surface of the rotatable member. The slowing of this relative rotation will serve to slow (e.g. halt) the rotation of a drum bearing a safety line.

The above is a general description of a friction brake and its function; many variations are possible. In some embodiments, a rotationally-activated braking device 10 may comprise a friction brake of the general type disclosed in the isolated exploded view of FIG. 3 of the above-mentioned U.S. patent application Ser. No. 16/630,584 and discussed in detail in the '584 application and in corresponding PCT Published Application WO2019/012454, both of which are incorporated by reference herein in their entirety. It will be appreciated that the particular design depicted in FIG. 3 of the '584 application is merely one example of a friction brake and of a ratchet arrangement; many different arrangements are possible. For example, FIG. 3 of the '584 application depicts a ratchet that comprises two contact surfaces and that is sandwiched between two layers of friction material. In other embodiments, a ratchet of a friction brake may only comprise a single contact surface which may be in contact with only a single layer of friction material. Furthermore, a ratchet may be radially inward-facing rather than radially outward-facing, as noted earlier herein. A friction brake that comprises a ratchet in the form of a radially-inward-facing toothed ring, and that comprises only a single contact surface that is in contact with a friction-braking surface of a single layer of friction material, is depicted in FIG. 4 of U.S. Pat. No. 8,430,206, which is incorporated by reference herein in its entirety.

In some embodiments, it may be convenient for a ratchet of the rotationally-activated braking device to serve as a rotatable member of the friction brake of the braking device. In many such designs, the ratchet is able to rotate with respect to the housing of the apparatus, but typically remains stationary during ordinary use of the apparatus. That is, the drum may rotate (relatively slowly) relative to the housing to extend and retract the safety line as a human user moves about a workplace. However, the ratchet, not being subjected to any rotational force, and being frictionally constrained by one or more layers of friction material, does not rotate relative to the housing. In the event that the drum begins to rotate rapidly e.g. due to a fall, the engaging end of a pawl engages with a tooth of the ratchet and overcomes this frictional constraint and causes the ratchet to rotate relative to the layer(s) of friction material and thus relative to the housing of the apparatus. The friction between the friction-braking surface of the friction material and the contact surface of the ratchet then slows or halts the rotation of the ratchet relative to the housing of the apparatus thus slowing or halting the rotating of the rotatable drum relative to the housing of the apparatus.

The assembly shown in exploded view in FIG. 11 is one example of this general type of friction brake. Such an assembly may rely on a ratchet 90 that, along with a layer of friction material 122, is sandwiched between a pressurization ring 125 and a backing plate 126. Ring 125 and plate 126 may be pressed together (e.g. by way of bolts that pass through the various orifices visible in FIG. 11) with a desired force that imparts the desired frictional characteristics. It will be appreciated that the items of FIG. 11 are merely one way of achieving such functionality; various modifications are possible (for example, rather than pressurization ring 125 and/or backing plate 126 being a separately-made item that is installed into a housing of a fall-protection apparatus, a portion of the housing itself may serve such a role).

It will be appreciated that many variations of the above-presented exemplary arrangements may be employed. For example, a separate plate, e.g. attached to the drum or co-mounted on a common shaft so that the separate plate is not rotatable relative to the drum, may provide a contact surface for a layer of friction material, rather than having the friction material directly in contact with a wall of the drum. In some embodiments a layer of friction material may itself be disposed on (e.g. laminated or bonded to) a support plate as discussed herein. In other embodiments, a layer of friction material may be "free-standing" rather than being bonded to a support plate. Any suitable friction material may be used, e.g. cork, rubber, and so on. Friction materials that may be particularly useful are described in the above-referenced U.S. patent application Ser. No. 16/630,584 and in corresponding PCT Published Application WO2019/012454, both of which are incorporated by reference herein in their entirety. The above discussions make it clear that any compatible type, design or arrangement of ratchet, friction material, and so on, may be used in combination with the herein-disclosed arrangement of pawls.

The arrangements disclosed herein may be advantageously used in any fall-protection apparatus; in particular, in a self-retracting lifeline. In addition to the documents previously cited herein, fall-protection apparatus such as e.g. self-retracting lifelines in which the arrangements disclosed herein may be advantageously utilized, are described in U.S. Pat. Nos. 8,181,744, 8,256,574, 8,430,206, 8,430,207, 8,511,434, and 9,488,235, and in U.S. Published Patent Application 2016/0096048.

In some embodiments the fall-protection apparatus is a self-retracting lifeline which meets the requirements of ANSI Z359.14-2014. In general, the arrangements disclosed herein may be used in any fall-protection apparatus in which there is a desire to enhance the performance of the product, e.g. by minimizing the occurrence of nuisance lockups that may occur during movements about the workplace, while ensuring that the braking device responds as quickly as possible in the event of an actual fall.

A fall-protection apparatus as described herein may comprise a housing, drum, rotationally-activated braking device, etc., of any desired size. In some embodiments, the apparatus may be sized so that it can serve as a so-called "personal" self-retracting lifeline as discussed later herein. The size of the rotationally-activated braking device may be characterized e.g. in terms of the diameter of the orbital path 25 that is followed by the pivot point 24 of the velocity-actuated pawl(s) 20. In various embodiments, the diameter of orbital path 25 may be at least 20, 30, 40, or 50 mm; in further embodiments, the diameter of orbital path 25 may be at most 150, 120, 90, or 60 mm.

In various embodiments, a fall-protection apparatus as described herein may be used in concert with, or as part of, any suitable fall-protection system such as e.g. a horizontal lifeline or retractable horizontal lifeline, a positioning lanyard, a shock-absorbing lanyard, a rope adjuster or rope grab, a vertical safety system (such as e.g. a flexible cable, rigid rail, climb assist, or fixed ladder safety system), a confined-space rescue system or hoist system, and so on. In some embodiments a fall-protection apparatus as disclosed herein may comprise a housing configured so that the interior of the apparatus is at least partially sealed (such as in the product line available from 3M Fall Protection under the trade designation (SEALED-BLOK) e.g. for use in harsh or marine environments. In some cases a fall-protection apparatus as disclosed herein may be suited for use in so-called "leading edge" workplace environments. It is still further noted that the discussions herein have primarily concerned apparatus (e.g. self-retracting lifelines) that comprise a housing that is e.g. mounted to an overhead anchorage and that comprises a safety line with a distal end that can be attached to a harness of a human user. It will be understood that the arrangements disclosed herein may also be used in e.g. "personal" self-retracting lifelines that comprise a housing that is mountable to a harness of a human user and that comprises a safety line with a distal end that can be attached e.g. to an overhead anchorage. Such apparatus are exemplified by the product line available from 3M Fall Protection under the trade designations TALON and NANO.

It will be understood that any such fall-protection apparatus may include, or be used with, various ancillary items which are not described in detail herein. Such items may include, but are not limited to, one or more of lanyards, shock absorbers, tear strips, harnesses, belts, straps, paddings, tool holsters or pouches, impact indicators, carabiners, D-rings, anchorage connectors, and the like. Many such apparatus, products, and components are described in detail e.g. in the 3M DBI-SALA Full-Line Catalog (Fall 2016). Although in many embodiments it may not be necessary due to the presence of the friction brake, in some embodiments the safety line of the apparatus may comprise an in-line shock absorber e.g. of the type described earlier herein. (An exemplary shock absorber is depicted in FIG. 1 of the previously-mentioned U.S. Pat. No. 9,488,235 patent, which is incorporated by reference in its entirety herein.) In other embodiments, no such shock absorber will be present. It will be understood that a fall-protection apparatus that is "non-motorized" as defined and described earlier herein, may still include such items as one or more electrically-powered sensors, monitors, communication units, actuators, and the like. Although discussions previously herein have primarily concerned products that completely arrest (stop) the motion of a human user, it is stipulated that in some embodiments, a fall-protection apparatus as described herein may serve merely to slow the fall of a user, and/or to allow the user to descend at a controlled rate.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event will such discussions serve to limit the claimable subject matter. To the extent that there is any conflict or discrepancy between this specification as written and the disclosure in any document that is incorporated by reference herein but to which no priority is claimed, this specification as written will control.

What is claimed is:

1. A fall-protection apparatus comprising:
   a drum with a safety line connected thereto and that is rotatable relative to a housing of the apparatus; and,
   a rotationally-activated braking device that comprises:
   at least one velocity-actuated pawl that is pivotally mounted on a pawl-support plate that is axially co-mounted with the drum and is co-rotatable with the drum, the at least one pawl being biased so that an engaging end of the at least one pawl is urged toward a disengaged position, and,
   at least one ratchet with at least one tooth that is engagable by the engaging end of the at least one pawl,
   wherein the pawl-support plate is rotatable relative to the drum, through a predetermined range between at least a first position and a second position;
   wherein when the pawl-support plate is in the first position, rotation of the rotatable drum above a predetermined first threshold value of rotational velocity causes the engaging end of the at least one pawl to be urged by centrifugal force into an engaged position in which it engages the at least one tooth of the ratchet, and,
   wherein when the pawl-support plate is in the second position, rotation of the rotatable drum above a predetermined second threshold value of rotational velocity causes the engaging end of the at least one pawl to be urged by centrifugal force into an engaged position in which it engages the at least one tooth of the ratchet,
   wherein the predetermined second threshold value of rotational velocity is lower than the predetermined first threshold value of rotational velocity, and
   wherein the pawl-support plate is biased toward the first position and is rotatable relative to the drum, from the first position to the second position, upon the pawl-support plate experiencing a rotational acceleration that is above a predetermined threshold value of rotational acceleration.

2. The fall-protection apparatus of claim 1 wherein the at least one velocity-actuated pawl is biased by way of a pawl-biasing spring, one end of which is attached to the at least one pawl, the other end of which is attached to a pawl-biasing-spring post that is fixed on the drum and protrudes axially from the drum so as to extend through a first elongate slot in the pawl-support plate.

3. The fall-protection apparatus of claim 2 wherein the first elongate slot extends at least generally circumferentially along the pawl-support plate, and wherein an elongate length of the first elongate slot defines the predetermined range of rotation of the pawl-support plate relative to the drum.

4. The fall-protection apparatus of claim 3 wherein the elongate length of the first elongate slot defines the predetermined range of rotation of the pawl-support plate relative to the drum, as being from at least 10 degrees to at most 60 degrees.

5. The fall-protection apparatus of claim 2 wherein the pawl-biasing-spring post is a load-bearing item that bears a portion of the load generated when the engaging end of the pawl engages with the at least one tooth of the ratchet.

6. The fall-protection apparatus of claim 1 wherein the pawl-support plate is biased by way of a plate-biasing spring, one end of which is attached to the pawl-support plate, the other end of which is attached to a plate-biasing-spring post that is fixed on the drum and protrudes axially from the drum so as to extend through a second elongate slot in the pawl-support plate.

7. The fall-protection apparatus of claim 6 wherein the second elongate slot extends at least generally circumferentially along the pawl-support plate, and wherein an elongate length of the second elongate slot defines the predetermined range of rotation of the pawl-support plate relative to the drum.

8. The fall-protection apparatus of claim 7 wherein the elongate length of the second elongate slot defines the predetermined range of rotation of the pawl-support plate relative to the drum, as being from at least 10 degrees to at most 60 degrees.

9. The fall-protection apparatus of claim 6 wherein the plate-biasing-spring post is a load-bearing item that bears a portion of the load generated when the engaging end of the pawl engages with a tooth of the ratchet.

10. The fall-protection apparatus of claim 1 wherein the pawl-support plate is biased in a circumferentially-forward direction relative to the drum and wherein upon the pawl-support plate experiencing a rotational acceleration that is above the predetermined threshold value of rotational acceleration, the pawl-support plate rotates through the predetermined range of rotation in a circumferentially-rearward direction relative to the drum.

11. The fall-protection apparatus of claim 1 wherein the at least one velocity-actuated pawl is biased by way of a pawl-biasing spring, one end of which is attached to the at least one pawl, the other end of which is attached to a pawl-biasing-spring post that is fixed on the drum and protrudes axially from the drum so as to extend through a first elongate slot in the pawl-support plate; and, wherein the pawl-support plate is biased by way of a plate-biasing spring, one end of which is attached to the pawl-support plate, the other end of which is attached to a plate-biasing-spring post that is fixed on the drum and protrudes axially from the drum so as to extend through a second elongate slot in the pawl-support plate;

and wherein the pawl-biasing spring and the plate-biasing spring are configured so that, when the drum is stationary and the at least one pawl is in a fully disengaged position, a biasing force that is exerted on the pawl-support plate by the plate-biasing spring to rotate in a direction, is greater than a biasing force that is exerted on the pawl-support plate by the pawl-biasing spring to rotate in an opposing direction, by a factor of at least 3.

12. The fall-protection apparatus of claim 11 wherein the pawl-biasing spring exhibits a long axis that is oriented at a first angle with respect to a radially-inward-outward direction of the drum and pawl-support plate, wherein the plate-biasing spring exhibits a long axis that is oriented at a second angle with respect to the radially-inward-outward direction of the drum and pawl-support plate, and wherein the second angle is greater than the first angle by at least 10 degrees.

13. The fall-protection apparatus of claim 11 wherein the pawl-biasing-spring post and the plate-biasing spring post are each a load-bearing item that bears a portion of the load generated when the engaging end of the pawl engages with a tooth of the ratchet.

14. The apparatus of claim 1 wherein the at least one pawl comprises a pivot point that follows an orbital path as the drum rotates and wherein the at least one pawl comprises a center of mass that is positioned so that the center of mass of the at least one pawl follows an orbital path that at least generally coincides with the orbital path followed by the pivot point of the at least one pawl.

15. The apparatus of claim 14 wherein when the at least one pawl is in a fully disengaged position, the orbital path followed by the center of mass of the at least one pawl, exhibits a diameter that is within plus or minus 4% of the diameter of the orbital path followed by the pivot point of the at least one pawl.

16. The apparatus of claim 14 wherein the center of mass of the at least one pawl is circumferentially offset from the pivot point of the at least one pawl, along the orbital path of the pivot point of the at least one pawl, by an offset angle of from at least 2 degrees, to at most 20 degrees.

17. The apparatus of claim 1 wherein the pawl is biased so that the engaging end of the at least one pawl is urged generally radially inwardly toward the disengaged position and wherein the rotationally-activated braking device is configured so that upon rotation of the rotatable drum above a predetermined rotational velocity, the engaging end of the at least one pawl is urged by centrifugal force, generally radially outwardly into the engaged position in which it engages a tooth of a radially-inward-facing ratchet.

18. The apparatus of claim 1 wherein the at least one velocity-actuated pawl comprises a pair of first, velocity-actuated pawls that are in circumferentially-opposing positions on the pawl-support plate from each other.

19. The apparatus of claim 1 wherein the apparatus is configured so that upon engaging of the engaging end of the at least one pawl with a tooth of the ratchet, the pawl-support plate and the drum are both brought to a hard stop, and wherein the safety line that is attached to the drum, includes an in-line shock-absorber.

20. The apparatus of claim 1 wherein the braking device comprises a friction brake comprising a layer of friction material that is in contact with a surface of the ratchet, and wherein the braking device is configured so that upon engaging of an engaging end of the at least one pawl with a tooth of the ratchet, the ratchet begins to rotate and continues to rotate until brought to a halt by the friction brake.

21. The apparatus of claim 1] wherein the apparatus is a self-retracting lifeline in which the safety line comprises a proximal end that is connected to the rotatable drum and a distal end that is attachable to a harness of a human user of the apparatus or to an anchorage of a workplace, and in which the rotatable drum is biased toward rotating in a direction that will retract the safety line onto the drum.

* * * * *

UNITED STATES PATENT AND TRADEMARK OFFICE
CERTIFICATE OF CORRECTION

| | | |
|---|---|---|
| PATENT NO. | : 11,779,783 B2 | Page 1 of 1 |
| APPLICATION NO. | : 18/013143 | |
| DATED | : October 10, 2023 | |
| INVENTOR(S) | : Greg E Schrank | |

It is certified that error appears in the above-identified patent and that said Letters Patent is hereby corrected as shown below:

In the Claims

<u>Column 22</u>
Line 52 (approx.), In Claim 21, delete "claim 1]" and insert -- claim 1 --, therefor.

Signed and Sealed this
Twenty-sixth Day of November, 2024

Katherine Kelly Vidal
*Director of the United States Patent and Trademark Office*